United States Patent [19]
De Angel

[11] Patent Number: 6,085,214
[45] Date of Patent: *Jul. 4, 2000

[54] DIGITAL MULTIPLIER WITH MULTIPLIER ENCODING INVOLVING 3X TERM

[75] Inventor: Edwin De Angel, Austin, Tex.

[73] Assignee: Cirrus Logic, Inc., Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/923,693

[22] Filed: Sep. 4, 1997

[51] Int. Cl.[7] ..................................................... G06F 7/52
[52] U.S. Cl. ........................................... 708/628; 708/631
[58] Field of Search ........................... 364/760.04, 760.05, 364/760.03, 760.02, 760.01; 708/631, 630, 629, 628, 632

[56] References Cited

U.S. PATENT DOCUMENTS

| | | | |
|---|---|---|---|
| 3,456,098 | 7/1969 | Gomez et al. ........................... | 235/164 |
| 3,691,359 | 9/1972 | Dell et al. ........................... | 364/760.02 |
| 4,864,529 | 9/1989 | Shah et al. ........................ | 364/760.03 |
| 5,220,525 | 6/1993 | Anderson et al. ................. | 364/760.04 |
| 5,325,321 | 6/1994 | Ishida ................................ | 364/760.03 |
| 5,333,119 | 7/1994 | Raatz et al. ........................ | 364/760.03 |
| 5,506,799 | 4/1996 | Nakao ................................. | 364/760.01 |
| 5,638,313 | 6/1997 | Chu .................................... | 364/760.02 |
| 5,754,459 | 5/1998 | Telikepalli ......................... | 364/760.02 |

*Primary Examiner*—David H. Malzahn
*Attorney, Agent, or Firm*—Robert D. Lott; Peter J. Rutkowski

[57] ABSTRACT

A digital parallel multiplier having encoders for each segmented bit pair of the multiplier input data and which selects one of 4 coefficients, based on the sum of the bit pair, that are then applied to the multiplicand input data. When a 3X coefficient of the multiplicand input data is to be generated, a −1 coefficient is output by the encoder requiring the 3X coefficient, and a 1 is added to the sum of the next most significant bit pair.

32 Claims, 21 Drawing Sheets

DIGITAL MULTIPLIER WITH MULTIPLIER ENCODING INVOLVING 3X TERM

CROSS-REFERENCE TO RELATED APPLICATIONS

Reference is made to copending application entitled "MULTIPLIER POWER SAVING DESIGN," Ser. No. 08/923,133, filed Sep. 4, 1997, and copending application entitled "MULTIPLIER SIGN EXTENSION," Ser. No. 08/923,133, filed Sep. 4, 1997, which are hereby incorporated by reference.

STATEMENT REGARDING FEDERALLY SPONSORED RESEARCH OR DEVELOPMENT

Not Applicable

TECHNICAL FIELD OF THE INVENTION

The present invention pertains to digital multipliers, and, more particularly, to small area digital multipliers.

BACKGROUND OF THE INVENTION

The modified-Booth algorithm (as described, for example, in A. D. Booth, "A Signed Binary Multiplication Technique," Quart. J. Mech. AppL Math, vol. 4, pt. 2, pp. 236–240, 1951; and in O. L. MarcSorley, "High-Speed Arithmetic in Binary Computers," IRE Proc, vol. 49, pp. 67–91, January 1961) is widely used to implement multiplication in DSP systems and other applications. Although this type of multiplier is not the fastest multiplier design, it does reduce the number of product terms to be added by half when compared to an array multiplier, and also allows a regular layout.

Modified Booth Algorithm

The modified Booth algorithm works essentially as follows: Given two numbers A and B, the algorithm analyzes the multiplier data A (taking three bits at a time) to determine whether to add zero, B, -B, 2B, or -2B based on the entire three bits. Table I shows the operation to be realized according to the three bits being analyzed. $R_i$ is the accumulated result up to the current iteration.

TABLE 1

Modified Booth Algorithm

| $A_{2i+1}$ | $A_{2i}$ | $A_{2i-1}$ | Operation |
|---|---|---|---|
| 0 | 0 | 0 | $R_i = R_{i-1} / 4$ |
| 0 | 0 | 1 | $R_i = (R_{i-1} + B) / 4$ |
| 0 | 1 | 0 | $R_i = (R_{i-1} + B) / 4$ |
| 0 | 1 | 1 | $R_i = (R_{i-1} + 2B) / 4$ |
| 1 | 0 | 0 | $R_i = (R_{i-1} - 2B) / 4$ |
| 1 | 0 | 1 | $R_i = (R_{i-1} - B) / 4$ |
| 1 | 1 | 0 | $R_i = (R_{i-1} - B) / 4$ |
| 1 | 1 | 1 | $R_i = R_{i-1} / 4$ |

Row 1 and Row 8 of table 1 will be called NOOP (NO OPERATION) since from the algorithm perspective no addition is performed, only a division by 4 (i.e, a shift). For the radix-4 modified Booth algorithm (i.e., analyzing 3 bits at a time with 1 bit of overlap) it can be observed that in comparison with an array multiplier the number of rows is reduced by half. A carry save array is used to add the partial products and a fast adder is used to add the final two words (i.e., carry and sum) producing the final product.

From table 1 it can be observed that the implementation of the modified Booth algorithm requires a 5:1 mux in order to add B, -B, 2B, -2B or zero to the partial product.

A significant improvement can be achieved to reduce the rows of the multiplier if a higher radix is used for the multiplier data (see, for example, H. Sam and A. Gupta, "A Generalized Multibit Recoding of Two's Complement Binary Numbers and Its Proof with Application in Multiplier Implementations," IEEE Transactions on Computers, vol. 39, pp. 1006–1015, 1990). The problem associated with this approach is that term 3B needs to be generated which is very difficult (i.e., time consuming). G. Bewick and M. J. Flynn ("Binary Multiplication Using Partially Redundant Multiples," Stanford University Technical Report, no. CSL-TR-92-528, 1992) propose the use of small adders to generate this term in a partially redundant form. Still this approach adds overhead to the multiplier and breaks the regular structure of the multiplier.

A. Y Kwentus, H. Hung, and A. N. Willson, Jr. ("An Architecture for High Performance/Small Area Multipliers for Use in Digital Filtering Applications," IEEE Journal of Solid-State Circuits, vol. 29, pp. 117–121, 1994) present the architecture of a multiplier where the terms 0, B, 2B, 3B are used. The main advantage of this multiplier is the reduction of the multiplexer from 5:1 (modified-Booth) to 4:1. The main disadvantage is that the 3B term needs to be pre-computed and stored in memory or generated with a fast adder.

TABLE 2

Kwentus Encoding

| $A_{2i+1}$ | $A_{2i}$ | Operation |
|---|---|---|
| 0 | 0 | $R_i = (R_{i-1}) / 4$ |
| 0 | 1 | $R_i = (R_{i-1} + B) / 4$ |
| 1 | 0 | $R_i = (R_{i-1} + 2B) / 4$ |
| 1 | 1 | $R_i = (R_{i-1} + 3B) / 4$ |

SUMMARY OF THE INVENTION

In accordance with the invention, a digital multiplier for multiplying multiplier data by multiplicand data to provide a product utilizes a multiplier data parsing circuit to parse the multiplier data on a group basis to form a first plurality of groups, and to select one of a second plurality of coefficients for further processing in the multiplier which is based, at least in part, on the content of each of the groups, and wherein the coefficient selected for at least one of the groups is a function of the entire content of at least one other of the groups.

BRIEF DESCRIPTION OF THE DRAWINGS

The aforementioned and other features, characteristics, advantages, and the invention in general will be better understood from the following more detailed description taken in conjunction with the accompanying drawings, in which.

Figure 1:
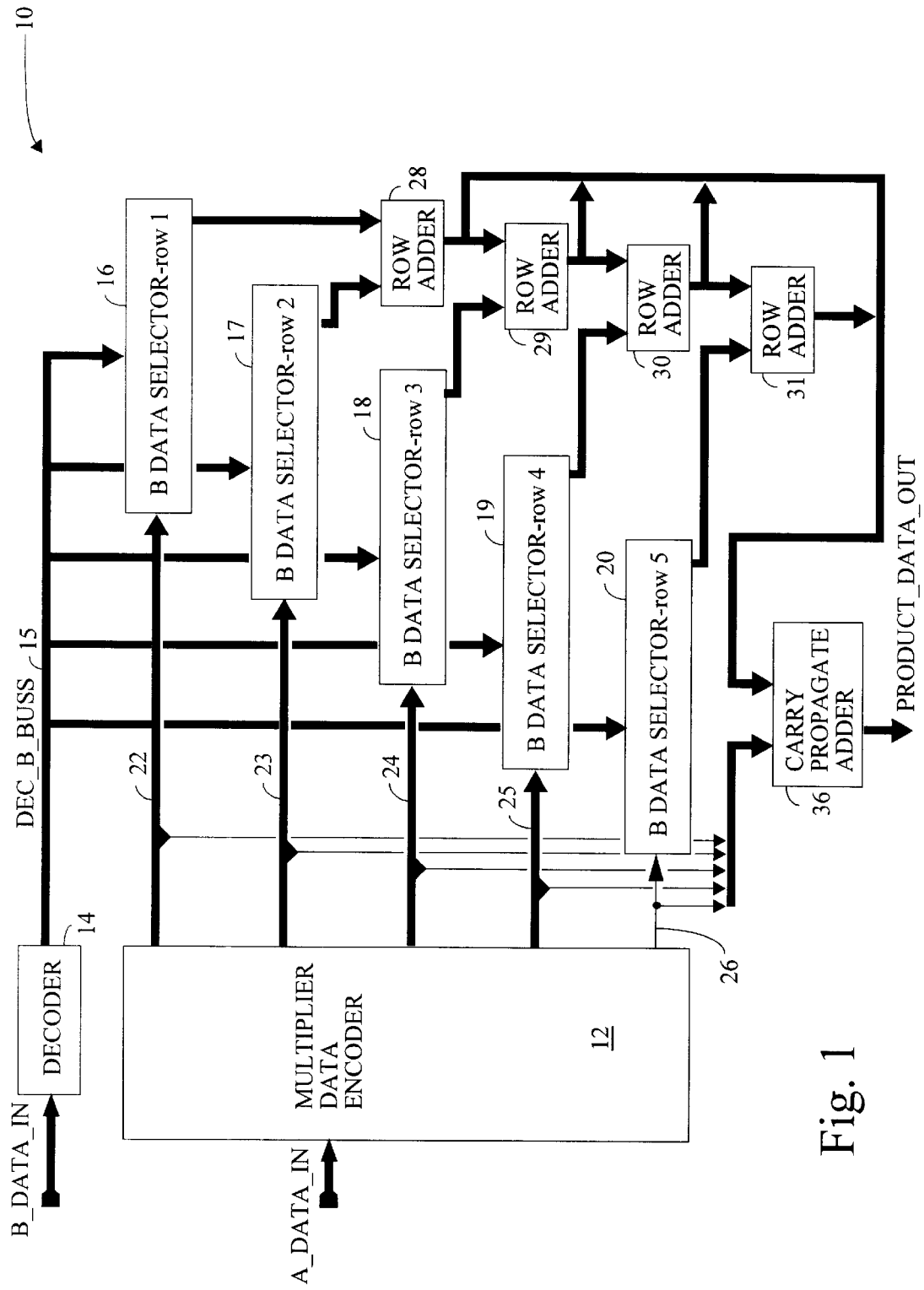
FIG. 1 is a block diagram of a digital multiplier according to the present invention.

It will be appreciated that for purposes of clarity and where deemed appropriate, reference numerals have been repeated in the figures to indicate corresponding features.

DETAILED DESCRIPTION OF THE INVENTION

Referring to FIG. 1, digital multiplier 10 is shown according to the present invention that utilizes a small layout on an integrated circuit chip and offers fast multiplier operations with low power consumption. The A data, which is defined as the multiplier data, is input as an eight bit string shown as signal A_DATA_IN and is input to MULTIPLIER DATA ENCODER 12. The B data, which is the multiplicand data, is input as an eight bit string shown as signal B_DATA_IN and is input to decoder 14. The output of decoder 14 is connected to sixteen bit bus 15, labeled DEC_B_BUS, that transfer the true and complement of the eight B bits to B data selectors 16, 17, 18, and 19 with true data only to data selector 20. MULTIPLIER DATA ENCODER 12 is connected to B DATA selectors 16–19, through buses 22–25 respectively. Single bit bus 26 connects MULTIPLIER DATA ENCODER 12 to B DATA SELECTOR 20.

Output buses from B DATA SELECTORs 16, 17 are added together in ROW ADDER 28. Selected bits of the output of adder 28 are added with the bus output of B DATA SELECTOR 18 by ROW ADDER 29. Selected bits of the output of adder 29 are added with the bus output of B DATA SELECTOR 19 by ROW ADDER 30. Selected bits of the output of adder 30 are added with the bus output of B DATA SELECTOR 20 by ROW ADDER 31. The output of adder 31 and the non-selected output bits of adders 28–30 form one input to carry propagate adder 36, the other input bus of which are the X3 output signals from MULTIPLIER DATA ENCODER 12.

In operation the A data is encoded in MULTIPLIER DATA ENCODER 12 and the output signals from MULTIPLIER DATA ENCODER 12 control B DATA SELECTORS 16–20 to select B true data, B complementary data (on an individual bit basis in the preferred embodiment), 2B true data, or no B data (NOOP) This encoding follows the algorithm shown in Table 3 below. Each of the rows of selected B data is then summed together in adders 28–31. This sum is then added to selected output bits of MULTIPLIER DATA ENCODER 12 in carry propagate adder 36 to form the output product PRODUCT_DATA_OUT, a 16 bit string.

Although the eight bit A data is segmented into only four pairs of bits, a fifth encoder 44 and a fifth B DATA SELECTOR 20 is necessary for sign extension because of the carry operation in encoder 43.

Figure 2A:
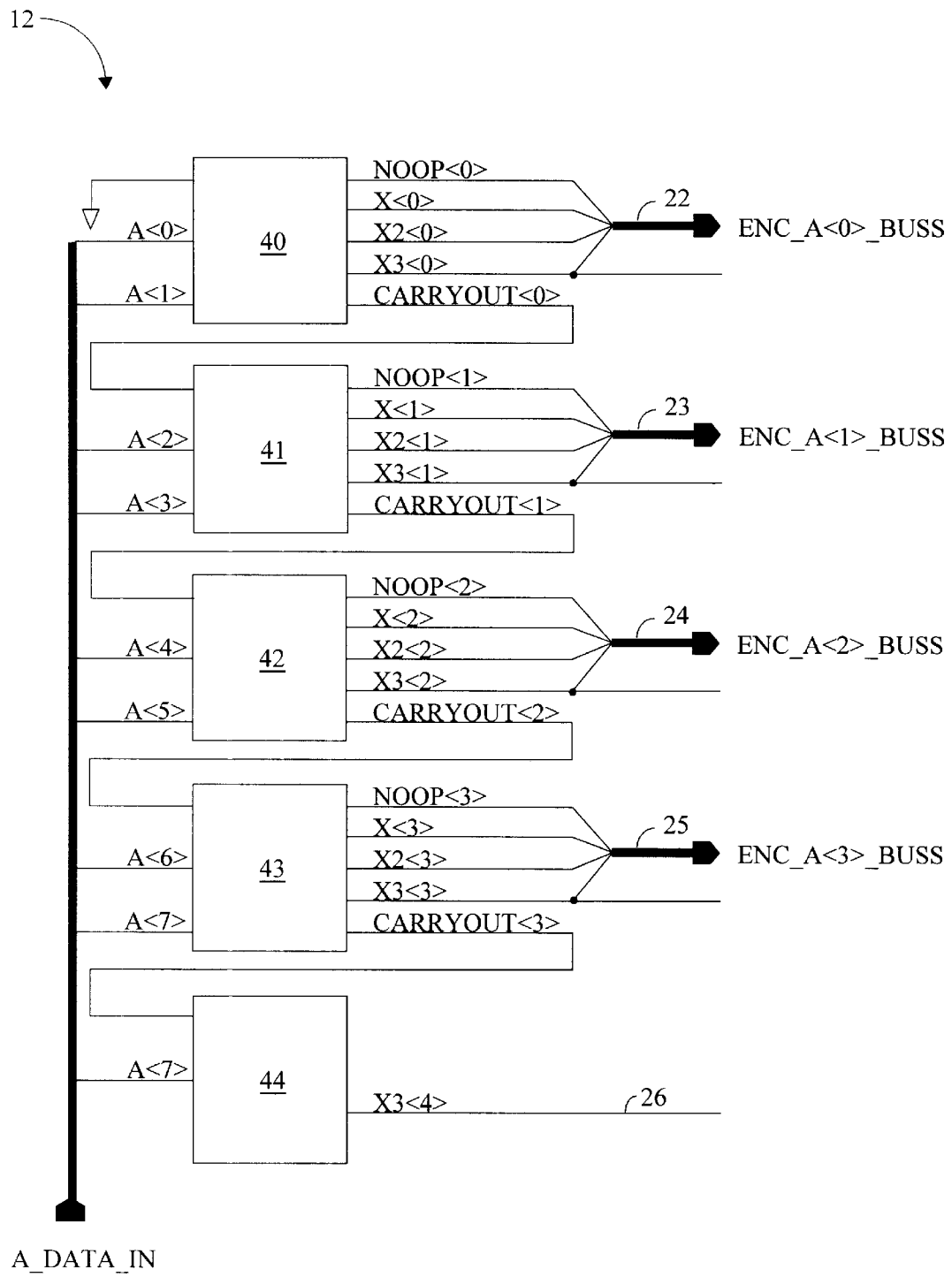
FIG. 2A is a block diagram of the MULTIPLIER DATA ENCODER shown in FIG. 1.

FIG. 2A is a block diagram of the ENCODER 12. There are four full encoders 40–43, and a simplified fifth encoder 44 to handle the carryout signal from the encoder 43. Each of encoders 40–43 have five output signals: NOOP, X, X2, X3, and CARRYOUT. Four of these signals are included on each bus line 22–25 for each encoder 40–43 respectively. There are three input lines to each of the encoders 40–43, one for each of the A data bit pairs, and a carryin signal. Top encoder 40 receives the least significant bit pair of the A data, and its carryin input is grounded. In each of the four remaining encoders, the carryin input is the carryout signal from the previous less significant encoder. Encoder 44 has only a single A data input which is the most significant bit of the A data and the carryin input. Its output is line 26(X3<4> line).

Figure 6A:
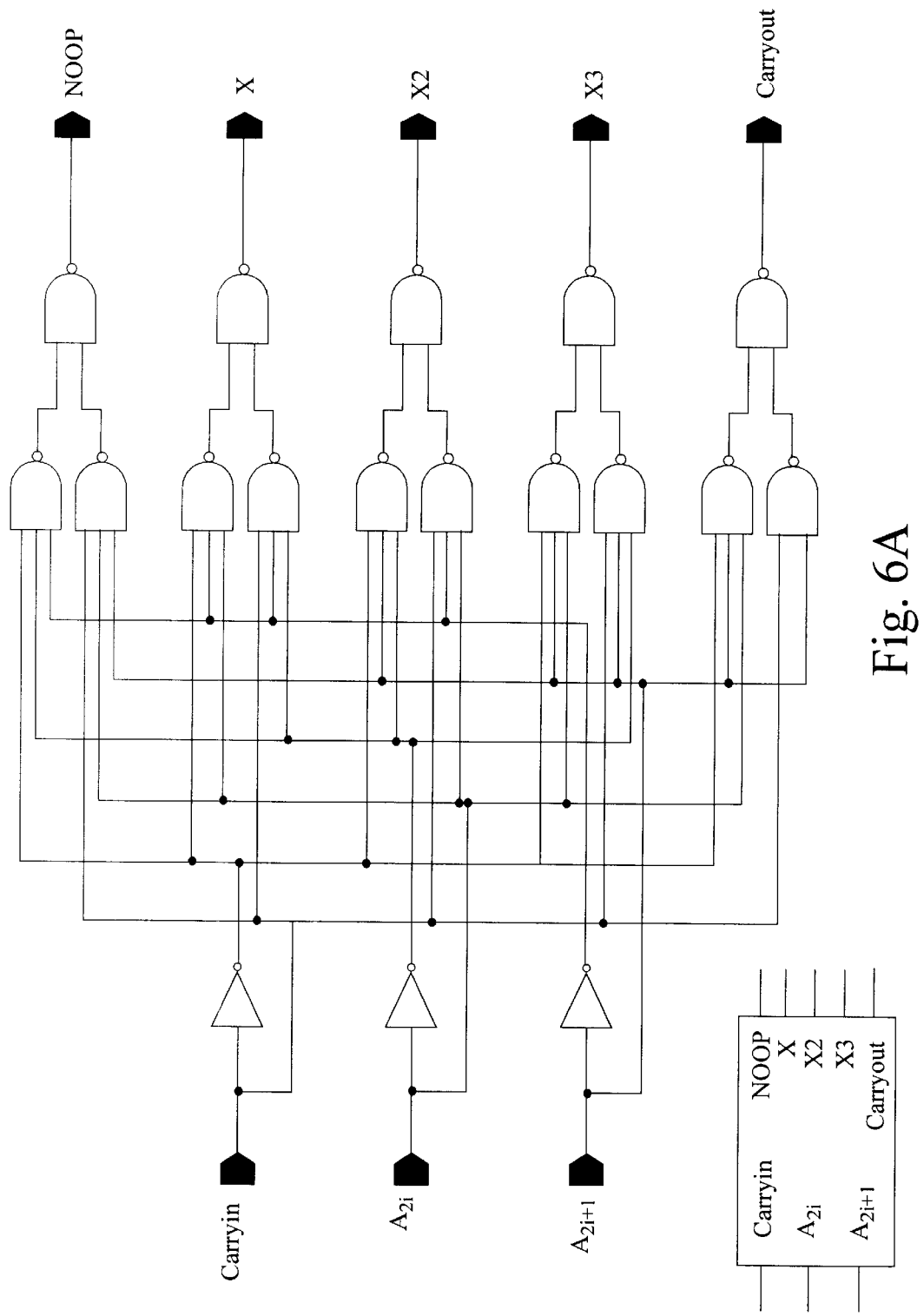
FIGS. 6A, 6B, 6C, and 6D are logic and circuit diagrams of the circuit blocks shown in FIGS. 2A, 3A, 3B, 3C, 3D, 4A, 4B, 5A, and 5B.
Figure 6B:
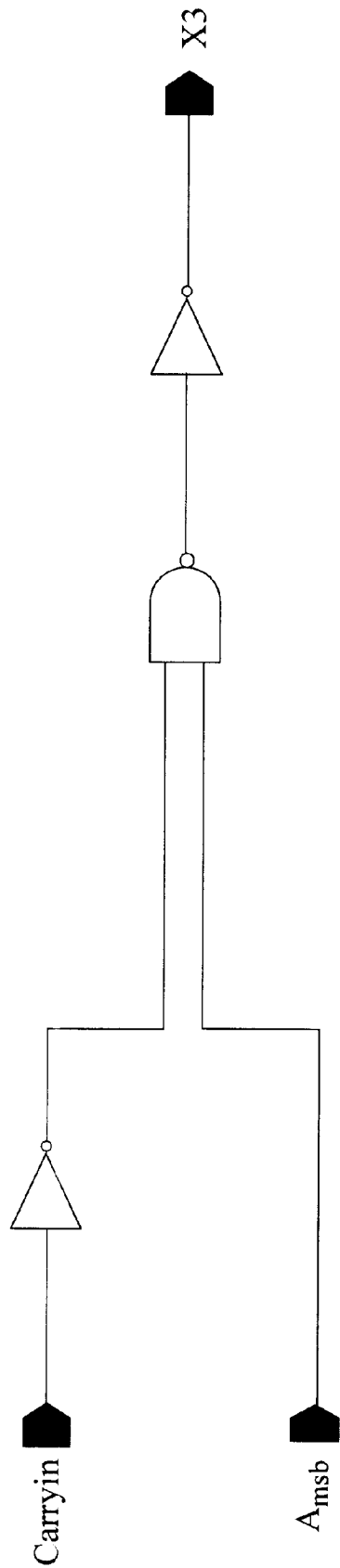
Figure 6B:
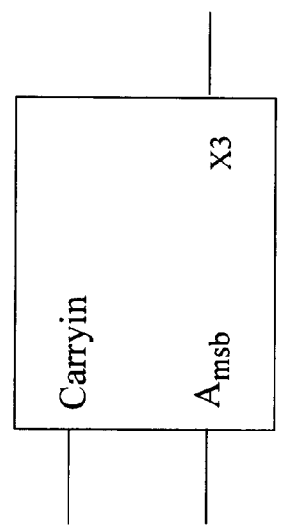

A logic diagram, along with a orientation drawing, of the encoders 40–43 is shown in FIG. 6A. A logic diagram and orientation drawing of encoder 44 is shown in FIG. 6B.

Figure 2B:
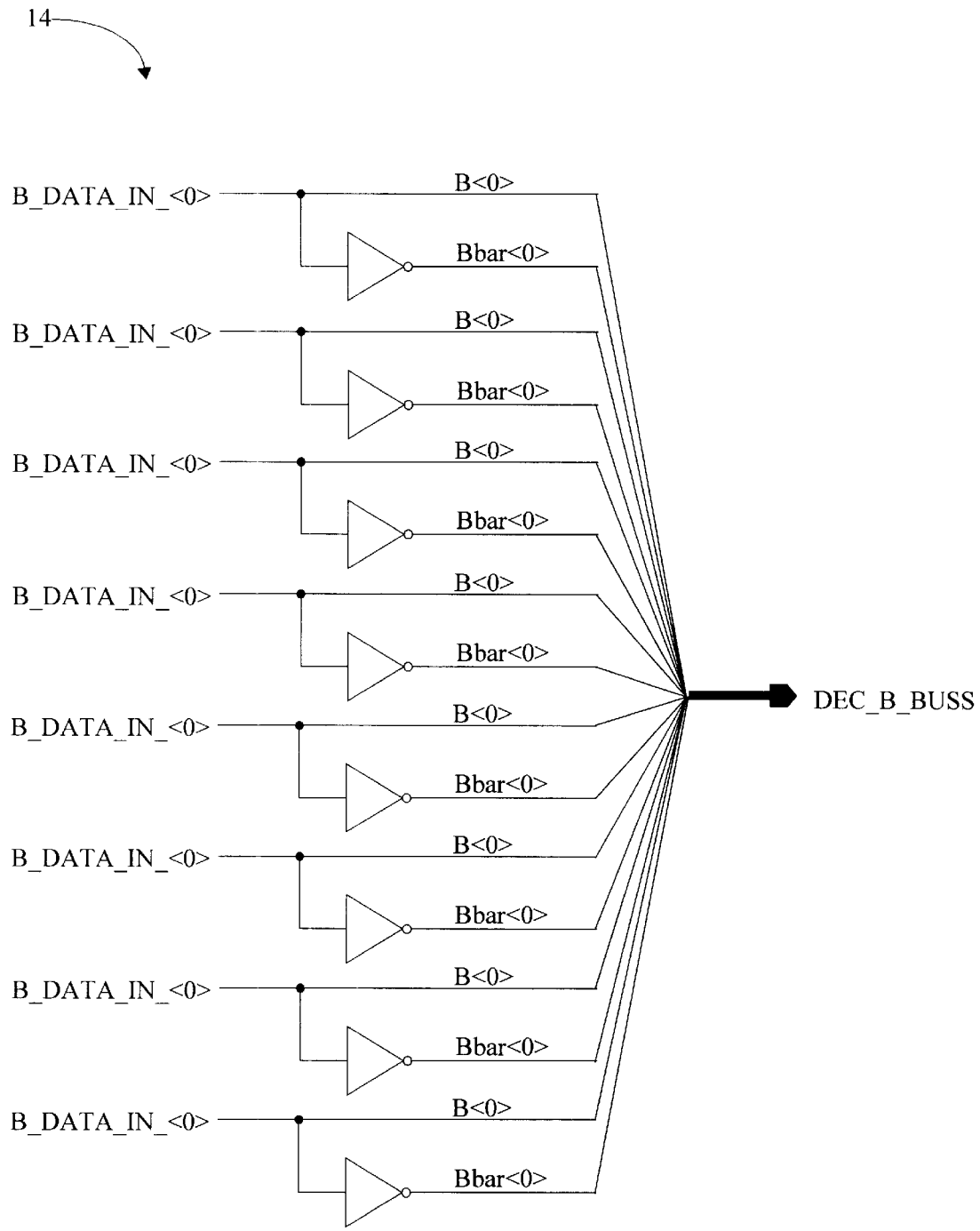
FIG. 2B is a logic diagram of the circuitry to provide the true and complement of the B Data used in FIG. 1.

FIG. 2B is a logic diagram of decoder 14 which provides the true and complementary bit signals of the B data on output bus DEC_B_BUS 15.

Figure 3A:
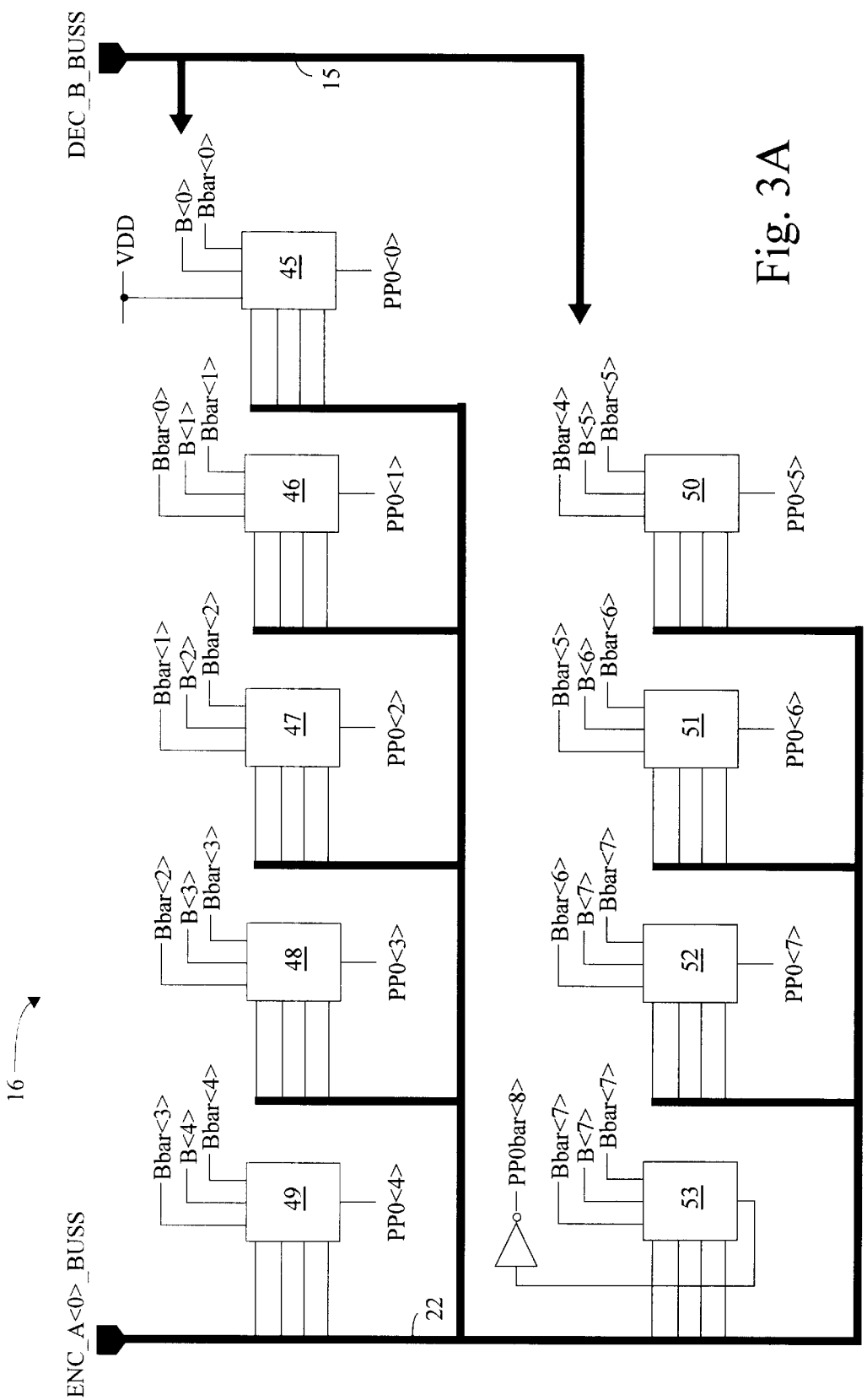
FIGS. 3A, 3B, 3C, 3D, and 3E are block and logic diagrams of the B DATA SELECTOR—row 1, 2, 3, 4, and 5, respectively, shown in FIG. 1.
Figure 3B:
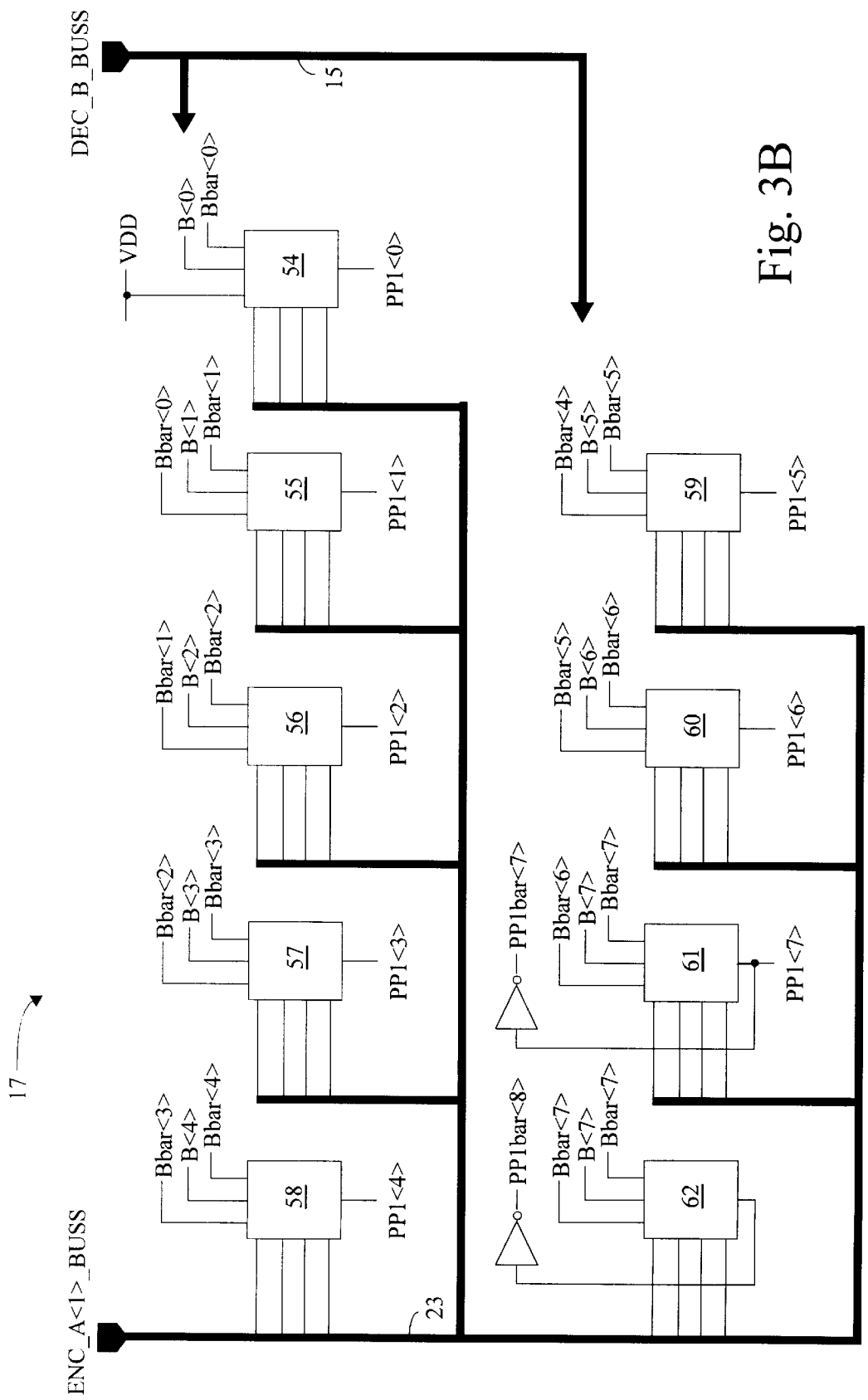
Figure 3C:
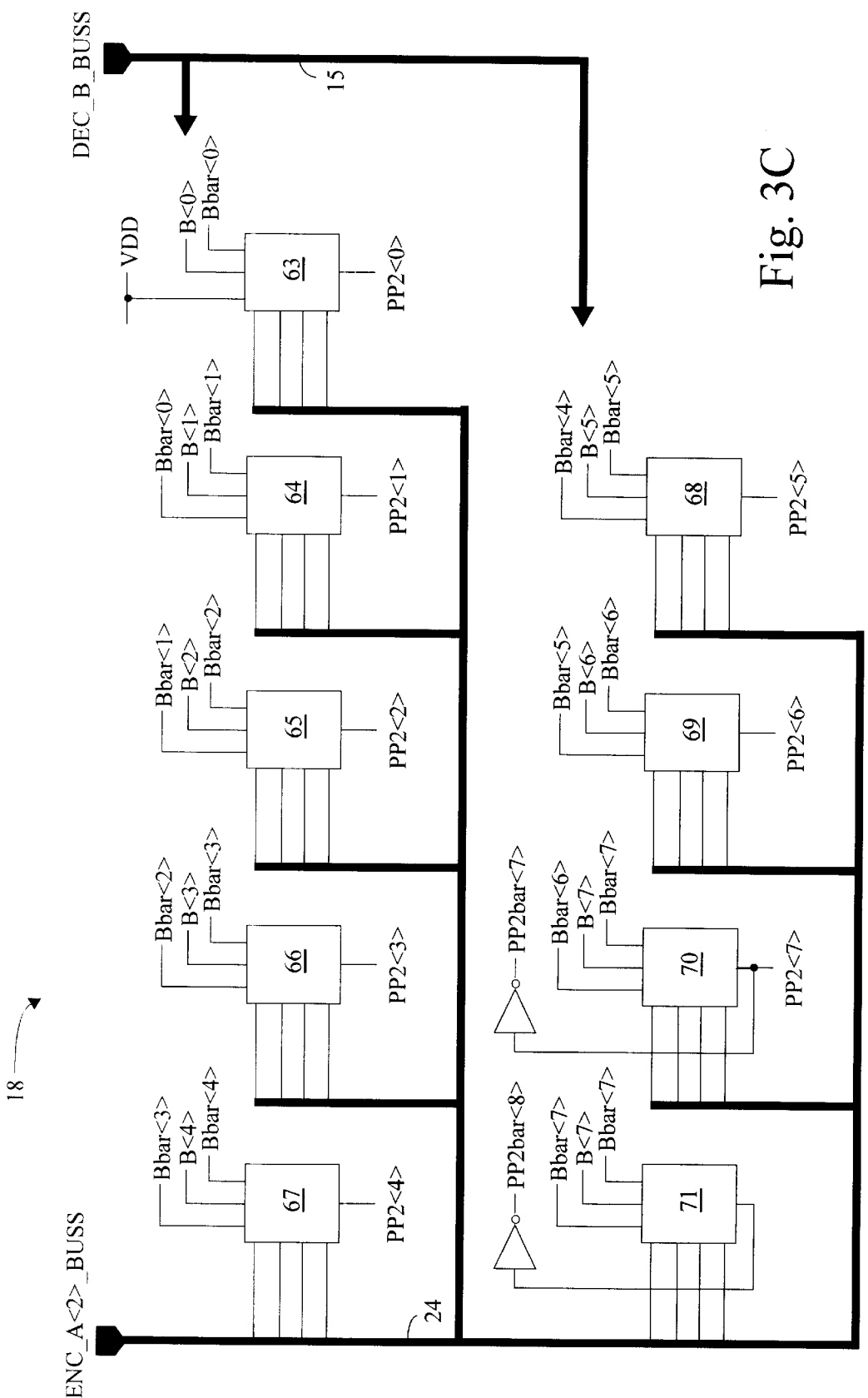
Figure 3D:
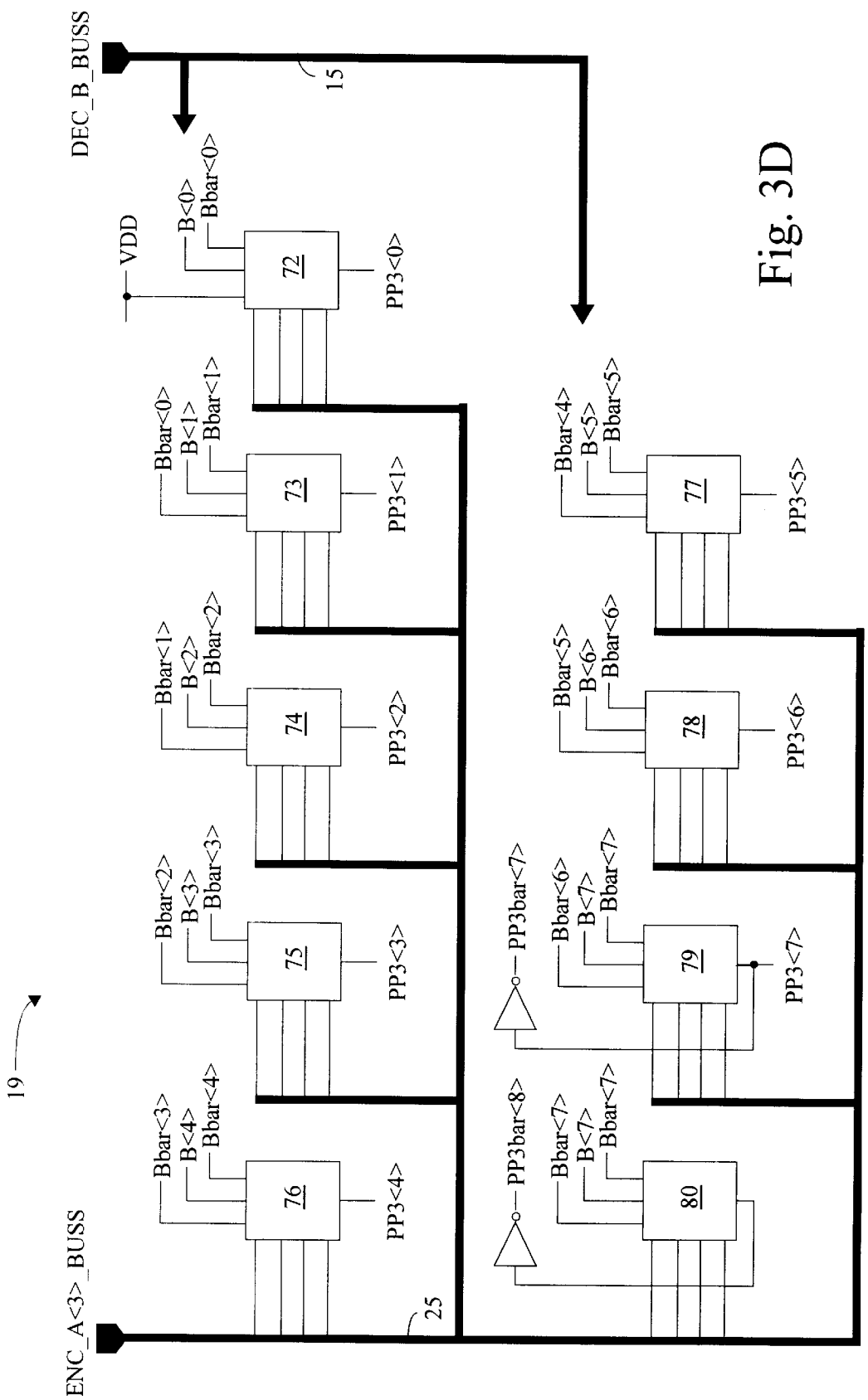
Figure 3E:
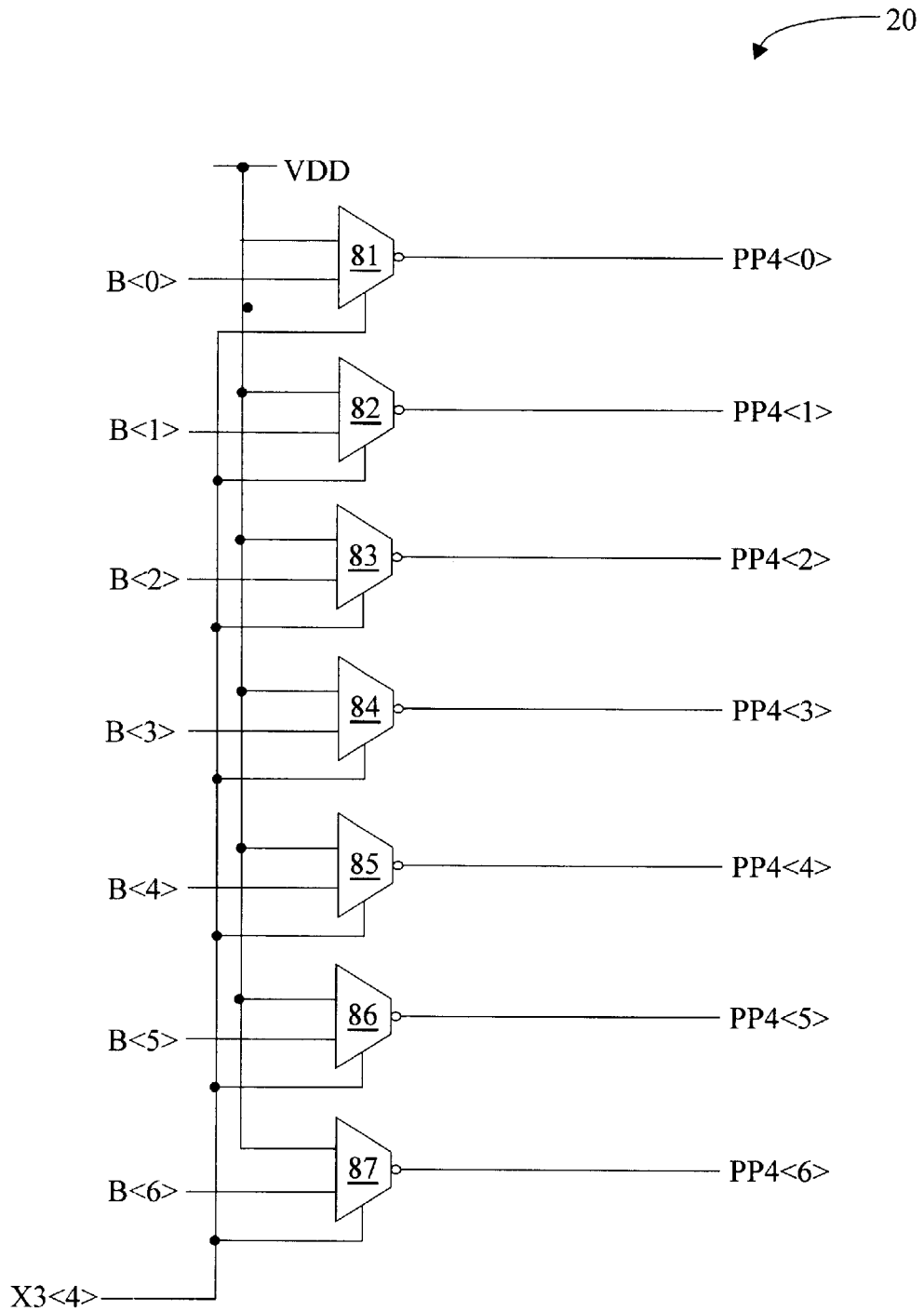
Figure 6C:
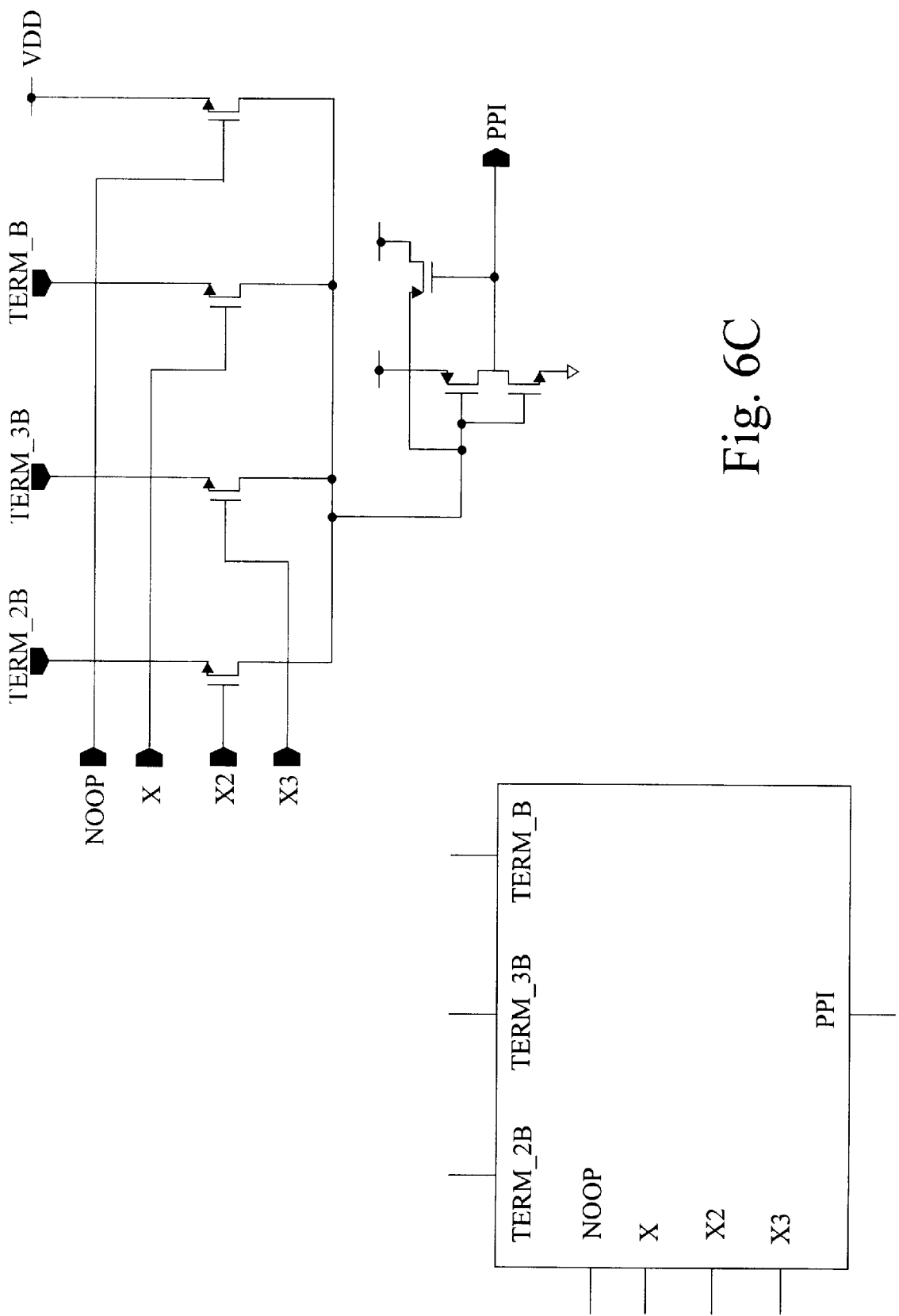

Each of B DATA SELECTION circuits 16–20 are shown in FIGS. 3A, 3B, 3C, and 3D as block diagrams of circuits 16–19, respectively, and in FIG. 3E as a logic diagram for circuit 20. FIG. 3A shows nine individual B data selection circuits 45–53. Each of these individual B data selection circuits 45–53 is controlled by the signals on the ENC_A<0>_BUS and selects one of three B data inputs or ignores the B data. The outputs from each of the circuits 45–52 is part of the data out of the B DATA SELECTOR—row 1. The output from circuit 53 is inverted and forms an additional signal on the data out of the B DATA SELECTOR—row 1. FIG. 6C is circuit diagram and an orientation diagram for each B data selection circuit 45–53. Note that the signals on the input terminals TERM_B, TERM_2B, TERM_3B and VDD are inverted when selected and placed on the output line PPI.

Similarly FIG. 3B is a block diagram of B DATA SELECTOR—row 2, and contains nine individual B data selection circuits 54–62. The circuit diagrams for these circuits are also shown in FIG. 6C. FIGS. 3C and 3D are respective block diagrams for B DATA SELECTOR—row 3 and B DATA SELECTOR—row 4, and each contain nine individual B data selection circuits numbered 63–71 in FIG. 3C and numbered 72–80 in FIG. 3D. The circuit diagrams for these circuits 63–71 and 72–80 are shown in FIG. 6C. The output from circuits 61 and 62 in FIG. 3B, 70 and 71 in FIG. 3C, and 79 and 80 in FIG. 3D, are each inverted to form two additional data out signals.

FIG. 3E is a logic diagram of the selector circuit 20. Since there is only one control line into the data selector of FIG. 3E, the data selection is performed with multiplexers 81–87. When the X3<4> signal is low, each of multiplexers 81–87 selects the VDD input, inverts it and places it on the PP4<0>–PP4<6> lines, respectively. Conversely when the X3<4> signal is high, the B<0>–B<6> lines are selected and inverted and placed on the PP4<0>–PP4<6> lines, respectively.

Figure 4A:
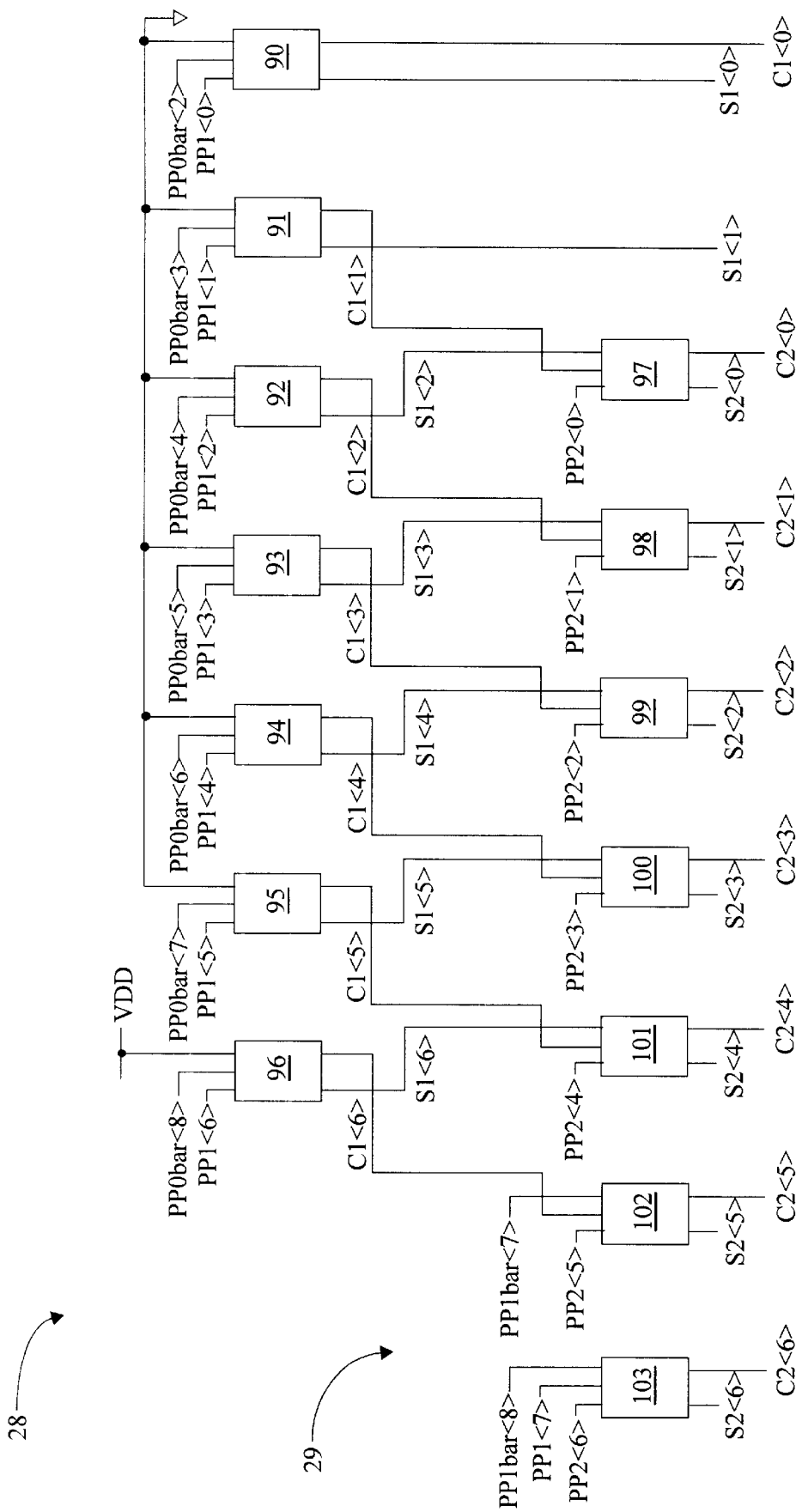
FIGS. 4A and 4B are block diagrams of the ADDER A, B, C, and D shown in FIG. 1.
Figure 4B:
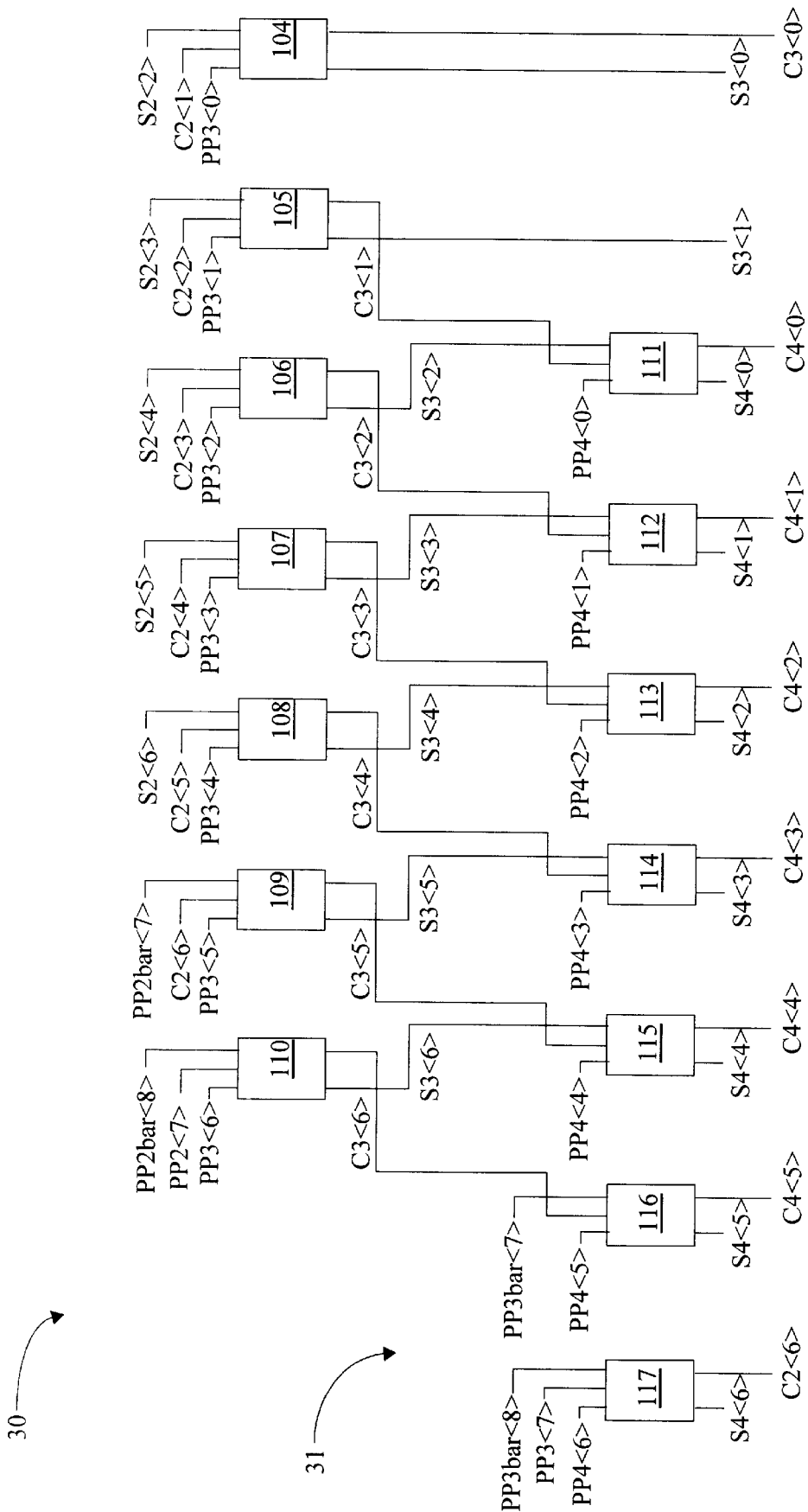

FIGS. 4A and 4B are block diagrams of adder circuits 28–31. Adder circuits 96–111 are shown in detail in FIG. 6D which also shows an orientation drawing of the circuit. The adders in FIGS. 4A and 4B receive the outputs from selector circuits 16–20 and provide an output to CARRY PROPAGATE ADDER 36 shown in FIGS. 5A and 5B.

In FIG. 4A adder circuit 96 has one of its inputs connected to VDD which provides the added logic 1 shown above the top row of Diagram 1: SIGN EXTENSION, shown below. The T bits of Diagram 1 are provided by the PP0bar<8> signal input to adder 96, the PP1bar<8> signal input to adder 103, the PP2bar<8> signal input to adder 110, and the PP3bar<8> signal input to adder 117.

The added logic ones on the left end of each of the rows of Diagram 1 are provided in the following manner: The left most logic 1 for the first or top row of Diagram 1 is included in adder 29 by placing the inverse of PP1<7> onto an input of adder 102, and placing PP1<7> onto an input of adder 103. This arrangement increments PP1<7> by one. Similarly, the left logic 1 for the second row is realized in adder 30 using PP2bar<7> and PP2<7> as inputs to adders 109 and 110, respectively; and the left logic 1 for the third row is realized in adder 31 using PP3bar<7> and PP3<7> as inputs to adders 116 and 117, respectively. Although Diagram 1 shows a logic 1 on the left end of the fourth or bottom row for purposes of generality, this last logic 1 is not needed since the product of two signed numbers, each having 7 data bits plus one sign bit, is 15 data bits and one sign bit. Since the left logic 1 of row four is occupying bit position 16, it is not needed and not generated in the embodiment of FIG. 1.

Figure 5A:
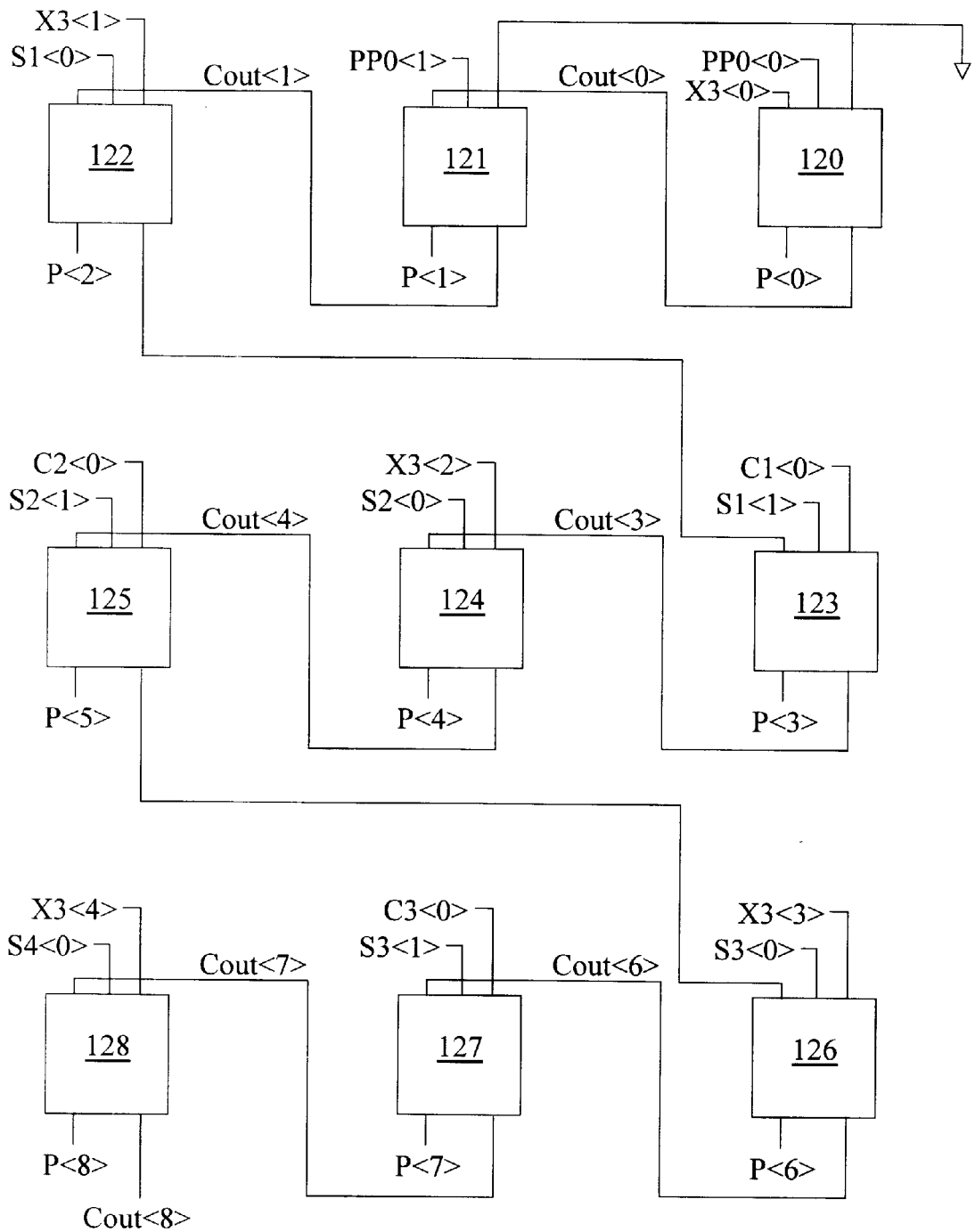
FIGS. 5A and 5B together are a block diagram of the CARRY PROPAGATE ADDER shown in FIG. 1.
Figure 5B:
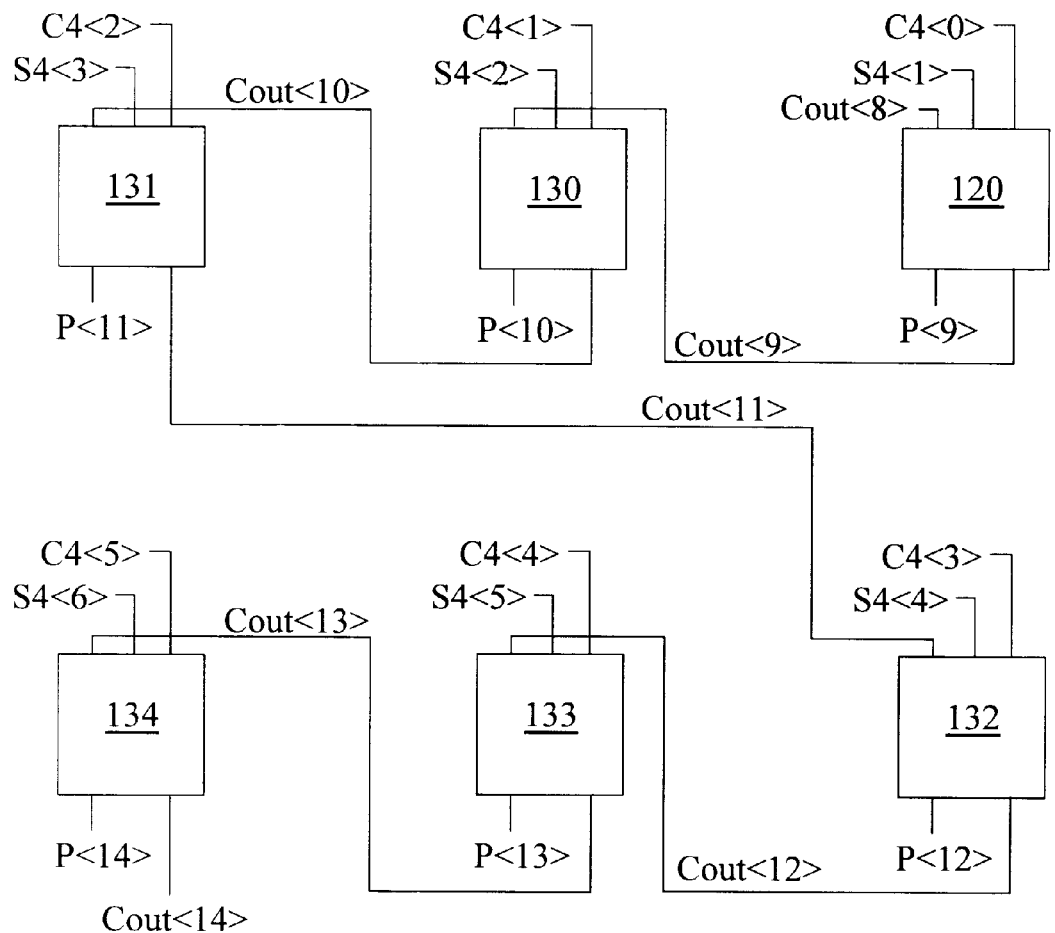
Figure 5B:
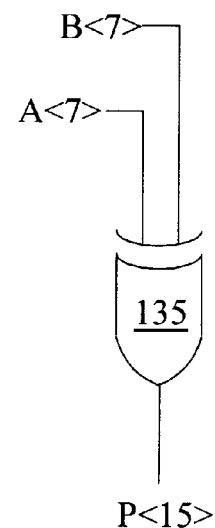
Figure 6D:
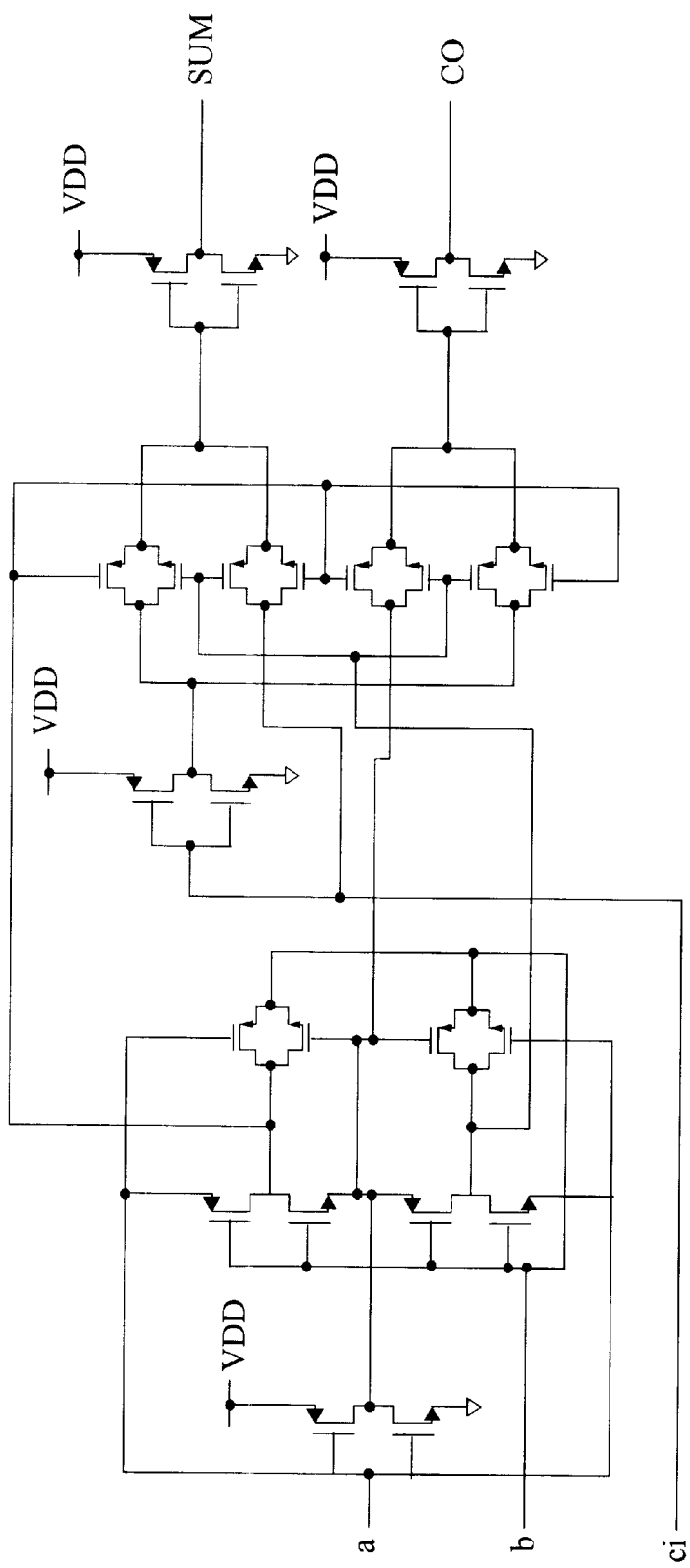
Figure 6D:
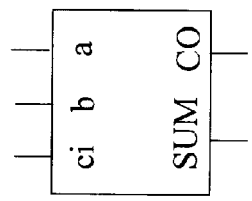

CARRY PROPAGATE ADDER 36 shown in FIGS. 5A and 5B contain adder circuits 120–134 which are also the circuits shown in FIG. 6D, and Exclusive Or gate 136 that provides the sign bit of the product. CARRY PROPAGATE ADDER 36 adds the two least significant bits of adders 28, 30, and 32, to the output of adder 34.

In addition CARRY PROPAGATE ADDER 36 adds a one in the first, third, fifth, and/or seventh least significant bit positions depending on whether X3<0>, X3<1>, X3<2>, X4<3>, and/or X3<4> data lines, respectively, are selected. These additional ones correspond to the D's shown in Diagram 1: SIGN EXTENSION. When an X3 line is selected, a –B is to be placed in the respective B DATA SELECTOR register. However, since –B is two's complement of B and only each of the inverted B bits is placed in the RESPECTIVE B data SELECTOR registers, CARRY PROPAGATE ADDER 36, if necessary, adds a 1 to the bit corresponding to the least significant bit for each register.

Figure 7:
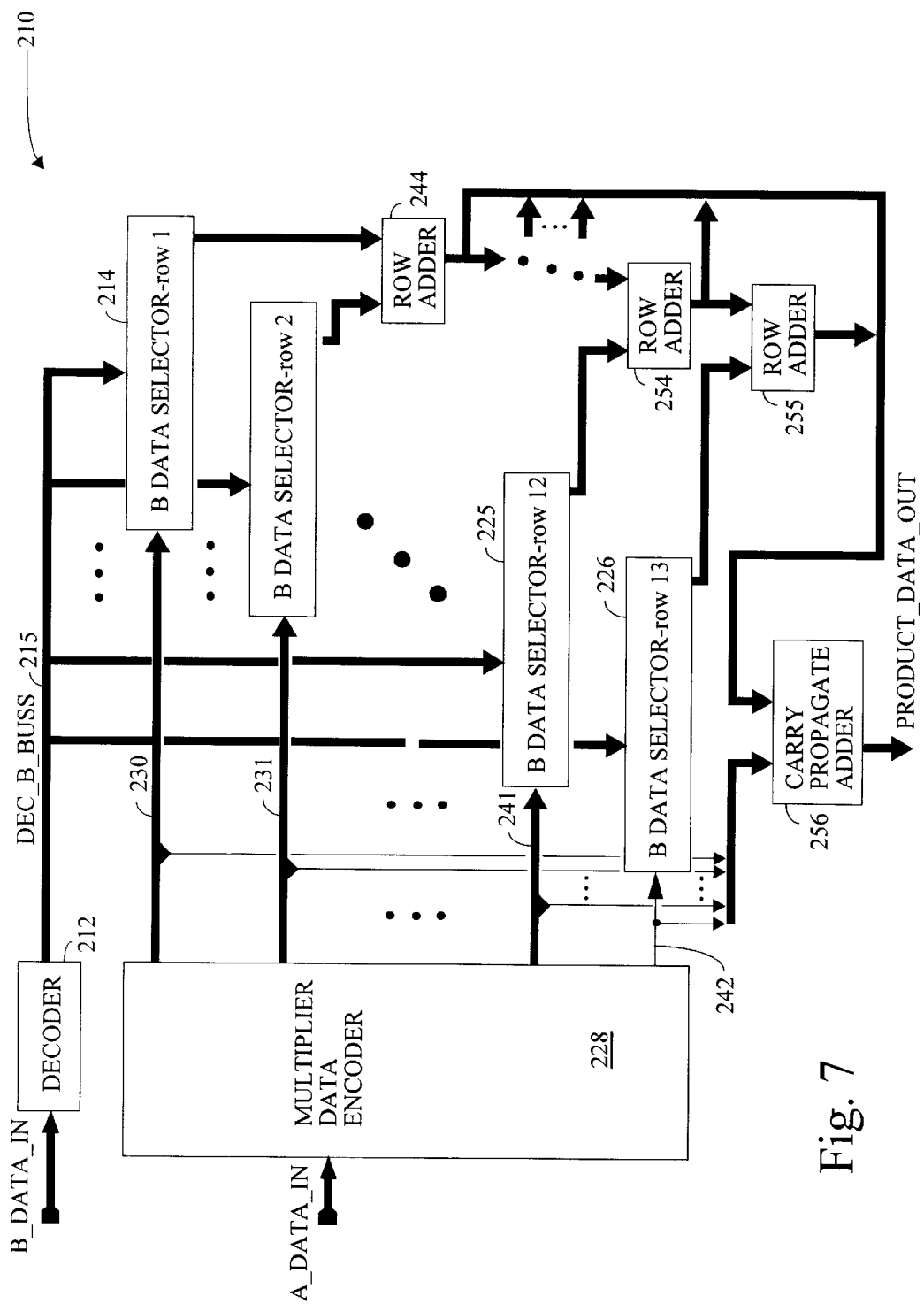
FIG. 7 is a block diagram of a 24 bit×24 bit multiplier according to the present invention.

FIG. 7 shows 24 bit×24 bit multiplier 210 according to the present invention. This embodiment is an extension of 8 bit×8 bit multiplier 10 of FIG. 1. 24 bit B_DATA_IN is decoded in decoder 212 to provide the true and complement of each data bit which is then connected to 13 B DATA SELECTOR circuits 214–226. 24 bit A_DATA_IN is encoded in MULTIPLIER DATA ENCODER 228 which produces outputs on 12 buses 230–241 plus an output on line 212. Outputs of selector circuits 214–226 are coupled into a series of 12 ROW ADDERS 244–255, the outputs of which passes into CARRY PROPAGATE ADDER 256 together with the X3 signal from buses 230–241 and line 242. The product of A and B, PRODUCT_DATA_OUT is at the output of adder 256.

Decoder 212 is an extension of decoder 14 of FIG. 2B with 24 input lines and 48 outputs.

Selector circuits 214–225 are an extension of selector circuits 16–19 shown in FIGS. 3A–3D. Selector circuits 214–225 each have 25 multiplexers of the type shown in FIG. 6C. In relation to FIG. 3A, for example, an additional 16 multiplexers can be thought of as inserted between multiplexers 51 and 52 and the associated signals (the numbers between the < and> symbols) for the additional multiplexers numbered incrementally. The associated signals for multiplexers 52 and 53 would increase by 16.

Selector circuit 226 is an extension of selector circuit 20 shown in FIG. 3E in that 16 additional 2 input multiplexers such as multiplexers 81–89 can be thought of as inserted between 2 input multiplexers 87 and 88 with input and output signals numbered incrementally. The signals associated with 2 input multiplexers 88 and 89 would be increased by 16, and signal X3<4> would become X3<13>.

MULTIPLIER DATA ENCODER 212 is an extension of MULTIPLIER DATA ENCODER 12 shown in FIG. 2A.

Eight more encoder circuits of the type shown in FIG. 6A can be thought of as inserted between encoders 43 and 44 with input/output signals numbered incrementally. The signals associated with (the numbers between the < and > symbols) encoder 44 would be increased by 8.

ROW ADDERS 244–255 are an extension of the circuits shown in FIGS. 4A and 4B. Each of adders 244–255 have 16 additional adder circuits in addition to the nine adder circuits for each of the adders 28–31 shown in FIGS. 4A and 4B. Each of the 16 additional adder circuits are of a type shown in FIG. 6D and can be thought of as inserted between adder circuits 94 and 95 of adder 28, for example, with their associated signals numbered incrementally. The signals associated with adder circuits 95 and 96 would be increased by 16.

CARRY PROPAGATE ADDER 256 is an extension of CARRY PROPAGATE ADDER 36. 32 additional adder circuits of the type shown in FIG. 6D can be thought of as inserted between adder circuits 136 and 137 with their associated signals numbered incrementally. The signals associated with adder circuits 137 would be increased by 32.

Both 8 bit multiplier 10 and 24 bit multiplier 210 operate is the same manner as would be expected.

Figure 8A:
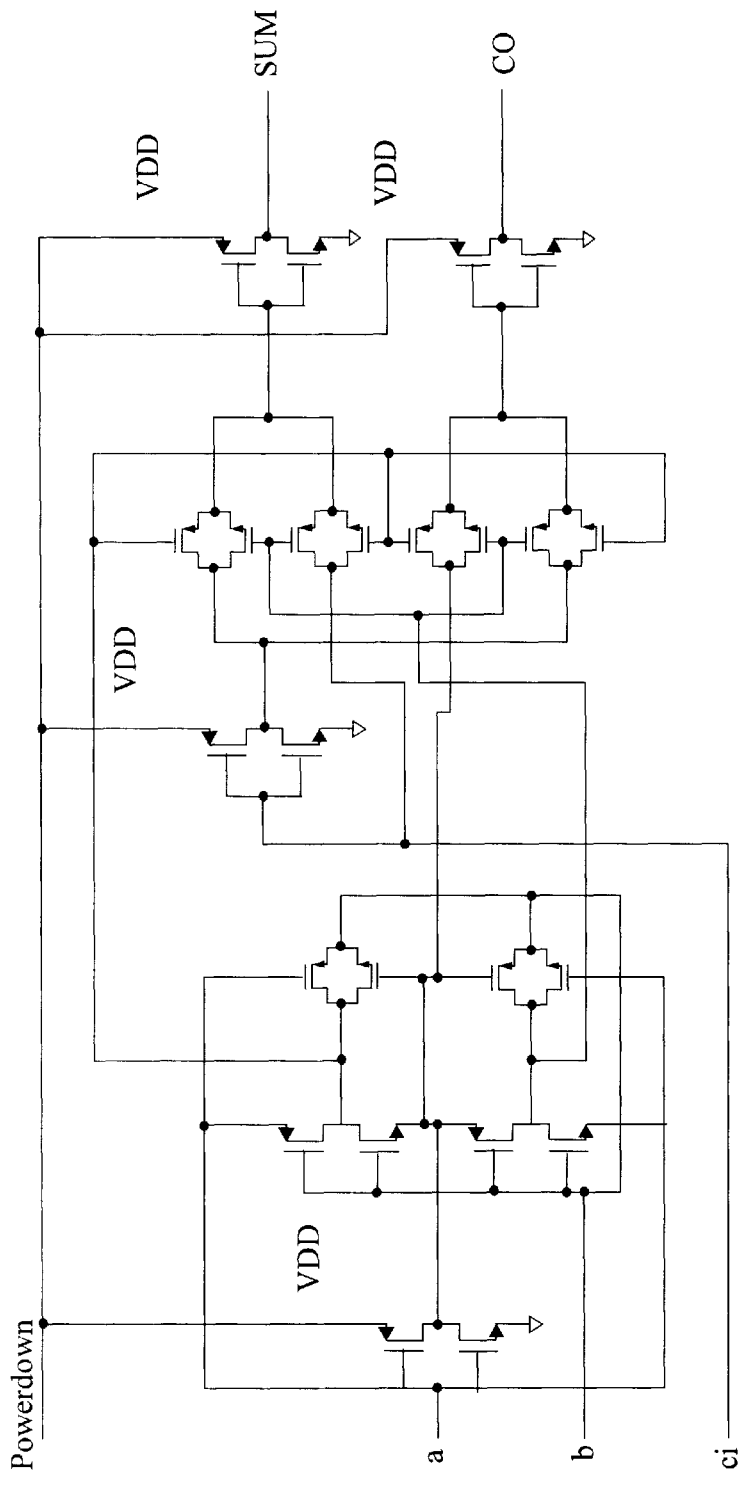
FIG. 8A is a schematic diagram on an alternative adder circuit to the circuit shown in FIG. 6D.
Figure 8A:
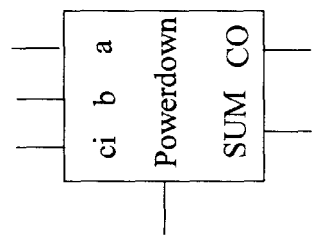

Multiplier 210 of FIG. 7 can be modified to advantageously save power in the multiplier. Adders 244–255 in the 24×24 bit multiplier 210 operate in a ripple manner in that a change in the input of the first adder 244 may cause a change in all of the following adders in a sequential manner. When a multiplication operation begins, adder 244 will have valid inputs to it when selector circuits 214 and 215 are stable, but adder 245 must wait for selector circuits 214–216 to be stable and for adder 244 to be stable before adder 245 can be stable. Since all of selector circuits 214–226 will usually be stable before adders 244–255 are stable, a power saving scheme is available by sequentially powering up adder circuits 244–255. Adder circuits 244–255 are therefore modified, as shown in FIG. 8A, to have their VDD inputs individually connected to a Powerdown signal.

Figure 8B:
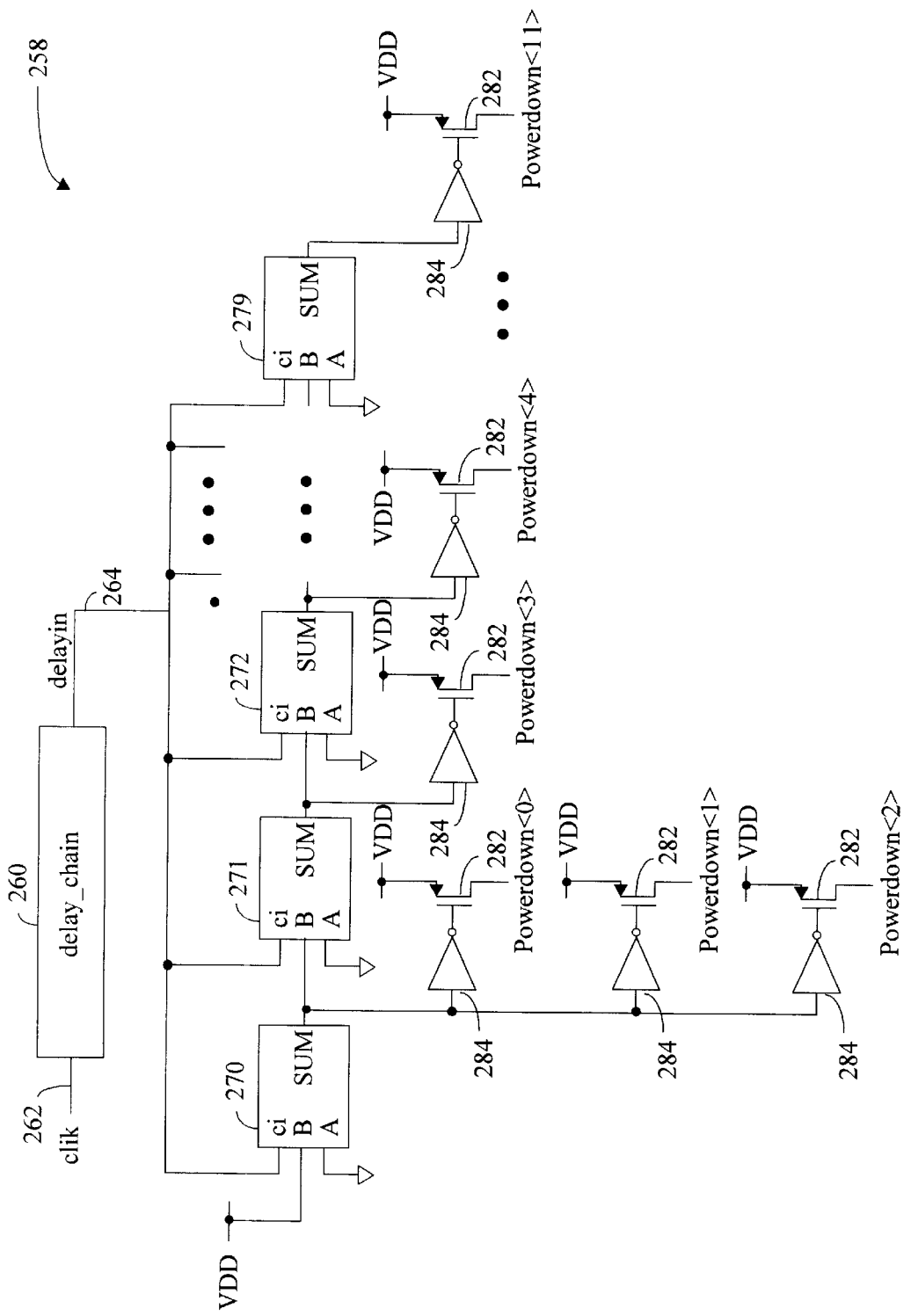
FIG. 8B is a partial block and partial schematic diagram of a circuit to provide power control to the adders of FIG. 8A.
Figure 8C:
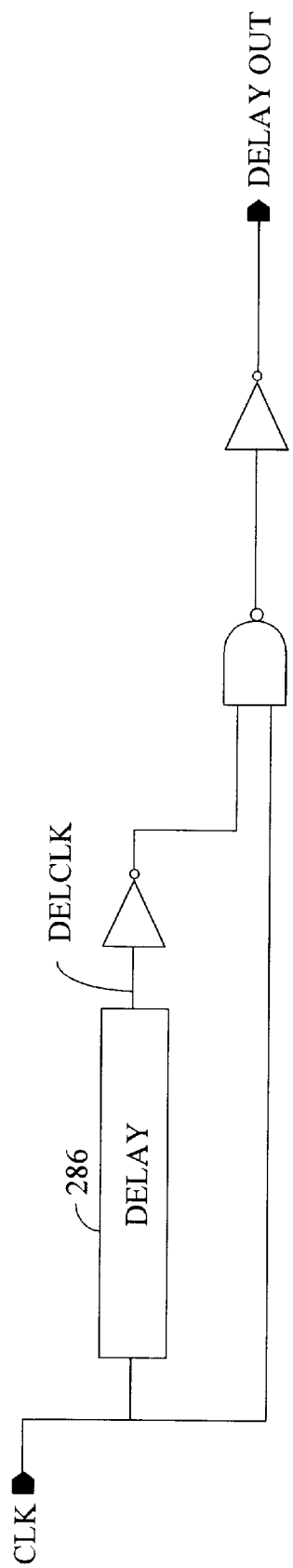
FIG. 8C is a logic diagram of the delay circuit shown in FIG. 8B.
Figure 8D:
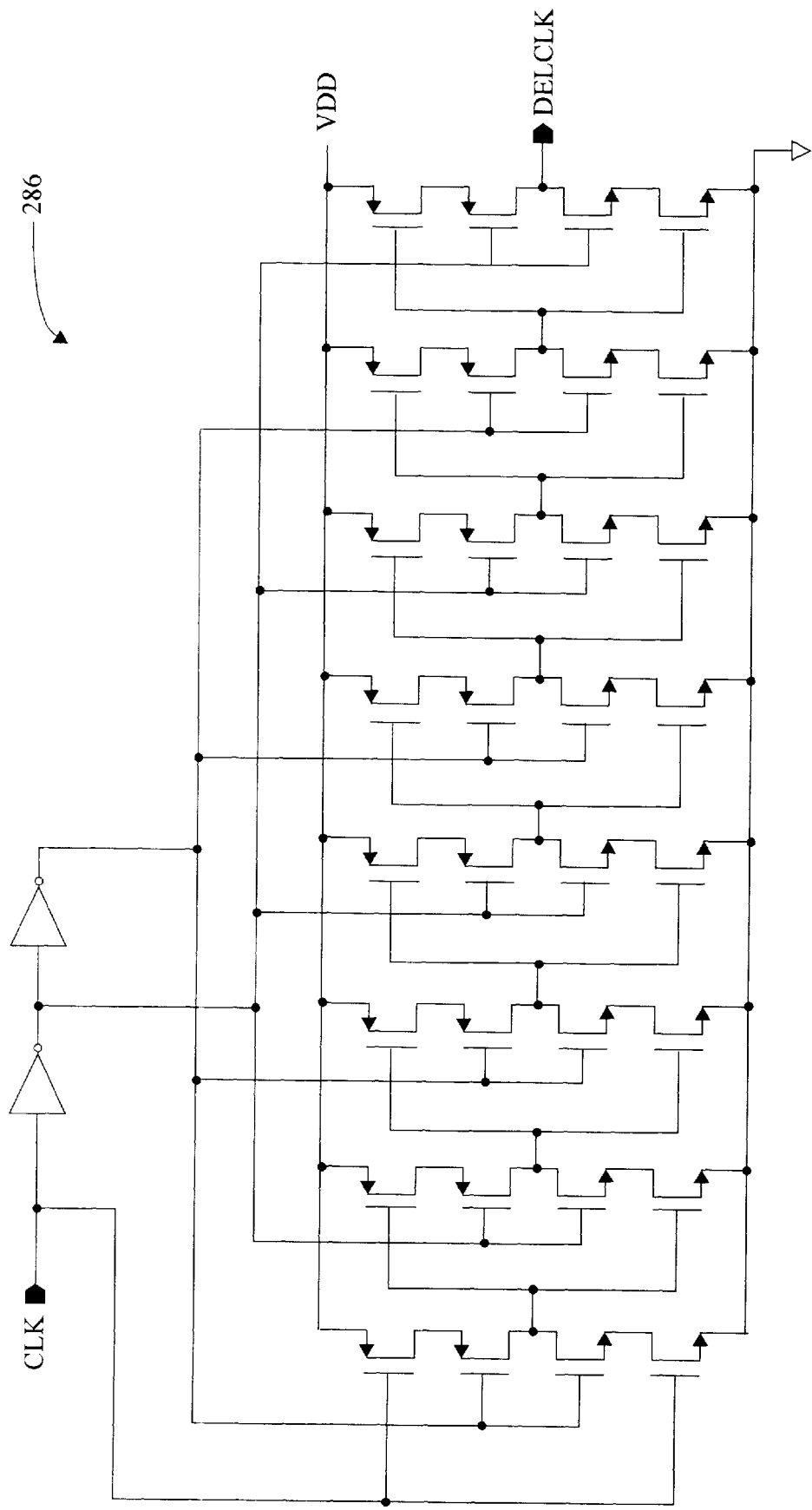
FIG. 8D is partial logic and partial schematic diagram of the DELAY circuit of FIG. 8C.

FIG. 8B shows a combination block diagram and circuit diagram 258 for generating the respective Powerdown signals Powerdown<0>–Powerdown<11> for adders 244–255. Clock input clk on line 262 is connected to the input of delay chain 260, which provides an output delayin on line 264. Delayin is connected to the carryin ci input of serially connected adders 270–279. These adders have their A inputs grounded and their B inputs connected to the output of the previous adder with the B input of adder 270 connected to VDD. Each adder output connects to a series combination of inverter 284 and the gate of transistor 282. Adder 270 has two additional inverter-transistor combinations such that when the output of adder 270 goes high, adders 244, 245, and 246 are powered up, with adders 247–255 powered up sequentially thereafter. FIG. 8C is a logic diagram of delay chain 260, and FIG. 8D is a logic and schematic diagram of DELAY circuit 286 of FIG. 8C.

The multiplication procedure according to the preferred embodiment includes the following: Given two numbers A and B to be multiplied, where A is the multiplier data and B is the multiplicand data, A is encoded or parsed two bits at a time starting with the least significant bit.

If A is an odd number of bits in length, then before the pairing of the bits a 0 is added to the left of the A data if A is unsigned or positive, or a 1 is added if A is negative. If A is an even number of bits in length, then before the pairing of the bits a 00 bit pair is added to the left of the A data if A is unsigned or positive, or a 11 bit pair is added if A is negative.

Since 3B is difficult to generate, an encoding scheme similar to that used by MacSorley in the article referenced above can be used. An example of this is as follows:

$7 = 00111 = 010 0\bar{1}$ that is, 7 can be represented as 8−1. The main result of this is that 3B becomes −B with a +1 added to the next couple of bits encoded. Table 3 shows this encoding.

TABLE 3

New Encoding

| Cin | $A_{2i+1}$ | $A_{2i}$ | Operation | Cout |
|---|---|---|---|---|
| 0 | 0 | 0 | $R_i = (R_{i-1}) / 4 + $ Cout | 0 |
| 0 | 0 | 1 | $R_i = (R_{i-1} + B) / 4 + $ Cout | 0 |
| 0 | 1 | 0 | $R_i = (R_{i-1} + 2B) / 4 + $ Cout | 0 |
| 0 | 1 | 1 | $R_i = (R_{i-1} - B) / 4 + $ Cout | 1 |
| 1 | 0 | 0 | $R_i = (R_{i-1} + B) / 4 + $ Cout | 0 |
| 1 | 0 | 1 | $R_i = (R_{i-1} + 2B) / 4 + $ Cout | 0 |
| 1 | 1 | 0 | $R_i = (R_{i-1} - B) / 4 + $ Cout | 1 |
| 1 | 1 | 1 | $R_i = (R_{i-1}) / 4 + $ Cout | 1 |

Note that the only changes from the Kwentus encoding of Table 2 with respect to the first four rows of Table 3 occur in the fourth row of table 3 where 3B is encoded as −B and C is a 1 added to the next couple of encoded bits.

Sign Extension

The sign extension of the multiplier can be implemented using a sign extension scheme similar to single zero representation as shown by E. de Angel and Earl E. Swartzlander ("Low Power Parallel Multipliers," VLSI Signal Processing IX, pp. 199–210, 1996).

Shown below is a partial product diagram for an 8×8 multiplier with the correction required to generate the sign extension. T is the one's complement of the sign and D is the correction constant required to generate the negative partial products (i.e., D=1 if the row above it was encoded with a −B coefficient (also sometimes referred to as a scale factor), and D=0 if the row above it was formed using any other coefficient).

Diagram 1: SIGN EXTENSION

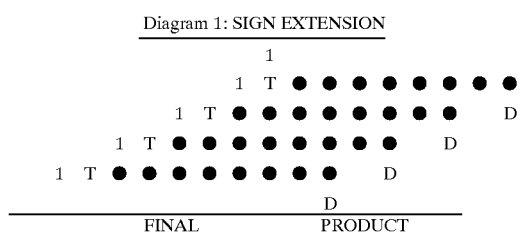

FINAL PRODUCT

EXAMPLES

Below are three examples showing the multiplication process. Bold numbers show the implementation of the sign extension. De Angel (referenced above) shows in detail how the sign extension is implemented. A. Inoue, R. Ohe, S. Kashiwakura, S. Mitarai, T. Tsuru, T. Izawa and G. Goto ("A 4.1 ns Compact 54×54b Multiplier Utilizing Sign Select Booth Encoders," International Solid-State Circuits Conference, pp. 416–417, 1997) shows a reduction of the 5:1 multiplexer through merging adjacent multiplexers. This technique allows a ratio of 10 transistors per bit. In this architecture a plain implementation of the 4:1 multiplexer using pass transistor logic (as described in K. Yano, T. Yamanaka, T Nishida, M. Saito, K. Shimohigashi and A. Shimizu, "A 3.8 ns CMOS 16×16b Multiplier Using Complementary Pass-Transistor Logic," IEEE Journal of Solid-State Circuits, vol. 25, pp. 388–395, 1990) results in 7 transistors per bit.

Example 1:
A = 2, B = 5 = 0101
A = 000010

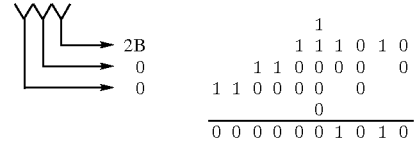

```
                              1
                    1 1 1 0 1 0
            1 1 0 0 0 0     0
    1 1 0 0 0 0     0
                              0
    ─────────────────────────
    0 0 0 0 0 0 1 0 1 0
```

Example 2:
A = −2, B = 5 = 0101
A = 111110

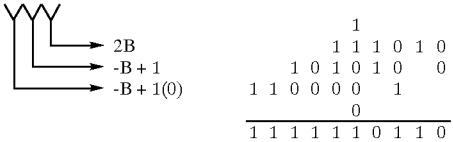

```
                              1
                    1 1 1 0 1 0
            1 0 1 0 1 0     0
    1 1 0 0 0 0     1
                              0
    ─────────────────────────
    1 1 1 1 1 1 0 1 1 0
```

In the second example the middle pair of the A bits produced −B+1, that is, −B for the present row and a 1 to carry to the next most significant pair of A bits. The most significant pair of A bits by themselves also would decode as −B for the present row and 1 to carry to the next pair of more significant A bits if there were any. Since there are not any more significant bits, this carry is discarded. However, the most significant pair of A bits (11) has a 1 bit carried in from the previous pair of A bits, and therefore decodes as (00) which is all zeros for the four data bits and two 1 bits for the sign bits.

Example 3:
A = 109, B = 5 = 0101
A = 0001101101

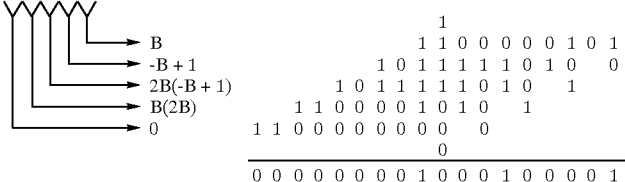

```
                                          1
                                1 1 0 0 0 0 0 1 0 1
                        1 0 1 1 1 1 1 0 1 0     0
                1 0 1 1 1 1 1 0 1 0     1
        1 1 0 0 0 0 1 0 1 0     1
1 1 0 0 0 0 0 0 0 0     0
                                          0
─────────────────────────────────────────
0 0 0 0 0 0 0 0 1 0 0 0 1 0 0 0 0 1
```

The third example is an 8×8 multiplication, and the carry operation in the Booth encoding occurs two times.

In comparison to the conventional prior art Booth multiplier discussed in the above BACKGROUND OF THE INVENTION, a multiplier using the present invention does not use 5:1 multiplexers, but 4:1 multiplexers, and with the consequential savings in chip area comes an improvement in speed of the multiplier.

Although the invention has been described in part by making detailed reference to a certain specific embodiment, such detail is intended to be, and will be understood to be, instructional rather than restrictive. It will be appreciated by those skilled in the art that many variations may be made on the structure and mode of operation without departing from the spirit and scope of the invention as disclosed in the teachings contained herein. For example the CARRY PROPAGATE ADDER 36, shown as standard ripple adder, could be replaced with a fast adder to improve the performance of the digital multiplier 10. Also, if the speed of the digital multiplier 10 is not critical, it would be possible to multiplex at least part of the B DATA SELECTORS 16–20, the adders 28–31 and 36, and/or the MULTIPLIER DATA ENCODER circuits 40–44 and thereby reduce the area required for the multiplier 10.

What is claimed is:

1. In a digital multiplier for multiplying a multiplicand by a multiplier to provide a product wherein said multiplier includes a bit signifying the sign of said multiplier, said multiplier is parsed on a group basis to form a first plurality of groups, and wherein selecting on a group by group basis, and based, at least in part, on a content of each of said groups, one of a second plurality of coefficients for further processing in said multiplier, a method of parsing comprising selecting said coefficients such that said coefficient selected for at least one of said groups is a function of the entirety of said content of at least one other of said groups.

2. The digital multiplier set forth in claim 1 wherein the number of bits in each of said groups is two.

3. The digital multiplier set forth in claim 1 wherein said members of said second plurality comprise one of a group of four coefficients.

4. The digital multiplier set forth in claim 3 wherein said members of said second plurality comprise one of a group of coefficients of 0, 1X, 2X, and −1X.

5. In a digital multiplier for multiplying a multiplicand by a multiplier to provide a product wherein said multiplier includes a bit signifying the sign of said multiplier, said multiplier is parsed on a group basis to form a first plurality of groups, and based, at least in part, on the content of each of said groups, selecting one of a second plurality of coefficients for further processing in said multiplier, and, wherein one of said plurality of coefficients having a 3X term in said coefficient, a method of parsing comprising generating said coefficient having a 3X term in said coefficient by substituting a −1 term for said 3X term is said coefficient, and adding a +1 to the digits of a next most significant group before a coefficient is selected for said next most significant group.

6. A method of digitally multiplying a multiplicand B by a multiplier A which is negative to produce a product comprising the steps of:
a) replicating the sign bit of multiplier A and placing said replicated sign bit in the next most significant bit position above the sign bit to form a replicated multiplier A;
b) parsing the bits of said replicated multiplier A into groups of adjacent bits;
c) beginning with a group having bits which are less significant than the other bits of said replicated multiplier A, selecting one of a plurality of coefficients based on said bits of said group, and, if said bits of said group are one of a predetermined set, offering a +1 to the group with the next most significant bits;
d) in all subsequent groups other than the group referred to in section c), combining the bits of each group with a +1 from another group, if offered, to form a new bit arrangement, selecting one of a plurality of coefficients based on said new bit arrangement, and, if said new bit is one of a predetermined set, offering a +1 to the group with the next most significant bits;
e) replicating said multiplicand B a number of times equal to the number of groups;
f) multiplying each of said replicated multiplicand Bs by one of said coefficients selected for each of said multiplier A groups to form coded multiplicand Bs where each of said coded multiplicand Bs correspond to one of said groups; and
g) multiplying at least one of said coded multiplicand Bs by 2 to the power of X where X is −1 plus the number equal to the corresponding group's ranking based on the relative significance of each groups original bits in the multiplier A with the group referred to in c) as the first group to form weighted multiplicand Bs; and
h) adding said weighted multiplicand Bs together to form the product.

7. In a digital multiplier for multiplying a multiplicand by a multiplier to provide a product wherein said multiplier includes a bit signifying the sign of said multiplier, said multiplier is segmented, and said segments are coupled into a first plurality of decoding circuits, each of said decode circuits providing a first output signal in response to said multiplier segment coupled into each of said decoding circuits, said decoding circuits further comprising an additional input to at least one of said decoding circuits which is from another output signal of another of said decoding circuits, said first output signal of said at least one of said decoding circuits being in response to both said multiplier segment coupled into said at least one of said decoding circuits and said additional input.

8. A method for digitally multiplying a multiplicand by a multiplier to provide a product comprising the steps of:
a) placing a first replica of a sign bit of said multiplier in a next most significant bit position of said sign bit to form an extended multiplier;
b) if necessary, adding additional replicas of said sign bit to subsequent more significant bit positions of said first replica such that data groups formed in step c) will have equal numbers of bits;
c) forming a first plurality of data groups from said extended multiplier;
d) selecting a coefficient for each of said data groups, and for at least one of said data groups said selection step determined by all bits of said each of said data groups and all bits of a second plurality of data groups;
e) applying said coefficients to each of a first plurality of copies of said multiplicand to provide a first plurality of weighted multiplicands;
f) summing said first plurality of multiplicands to form said quotient.

9. The method set forth in claim 8 wherein the process of forming a first plurality of data groups comprises the step of segmenting said bits of said multiplier data.

10. The method set forth in claim 9 wherein the number of bits in each of said groups is two.

11. The method set forth in claim 8 wherein said step of selecting a coefficient comprises the step of selecting a coefficient from a predetermined set of coefficients.

12. The method set forth in claim 11 wherein said step of selecting a coefficient comprises the step of selecting a coefficient having a scale factor selected from a predetermined set of four scale factors.

13. The method set forth in claim 12 wherein said step of selecting a coefficient comprises the step of selecting said scale factor from one of 0, 1X, 2X, and −1X.

14. A method for multiplying a multiplicand by a multiplier to provide a product comprising the steps of:
   a) placing a first replica of a sign bit of said multiplier in a next most significant bit position of said sign bit to form an extended multiplier;
   b) if necessary, adding additional replicas of said sign bit to subsequent more significant bit positions of said first replica such that groups formed in step c) will have equal numbers of bits;
   c) regrouping bits of said extended multiplier to form a first plurality of groups wherein, based on the bit position of the extended multiplier bits selected for each group, said groups have a predetermined hierarchy ranging from a least significant group to a most significant group;
   d) for each of said first plurality of groups selecting one of a second group of coefficients based, at least in part, on all bits of said each of said first plurality of groups;
   e) determining if said coefficient is a 3X coefficient,
      i) if said coefficient is a 3X coefficient, changing said coefficient to a −1X coefficient, and
      ii) if said coefficient is a 3X coefficient and if there is a next most significant group, adding a +1 to the digits of a next most significant group prior to the selection of the coefficient for the next most significant group;
   f) applying said coefficients to each of a first plurality of copies of said multiplicand to provide a first plurality of weighted multiplicands; and
   g) summing said first plurality of multiplicands to form said quotient.

15. The method set forth in claim 14 wherein the process of regrouping comprises the step of segmenting said bits of said multiplier.

16. The method set forth in claim 15 wherein the number of bits in each of said groups is two.

17. The method set forth in claim 14 wherein said step of selecting one of a second group of coefficients comprises the step of selecting a coefficient having a scale factor selected from a predetermined set of four scale factors.

18. The method set forth in claim 17 wherein said step of selecting one of a second group of coefficients comprises the step of selecting said scale factor from one of 0, 1X, 2X, and 3X.

19. A method for selecting a plurality of coefficients for scaling a like plurality of copies of multiplicand data in a digital multiplier comprising the steps of:
   a) placing a first replica of a sign bit of multiplier data in a next most significant bit position of said sign bit to form extended multiplier data;
   b) if necessary, adding additional replicas of said sign bit to subsequent more significant bit positions of said first replica such that groups formed in step c) will have equal numbers of bits;
   c) forming a like plurality of groups of bits selected from bits of said extended multiplier data, said bits in each of said groups comprised of bits of said extended multiplier data which are adjacent each other in bit position, each of said groups having a hierarchy with each of the other groups based on the relative bit positions of said extended multiplier data contained therein;
   d) for each group selecting one of a predetermined set of scale factors based on said bits of said group and multiplying said scale factor by $2^N$ where N is a respective group's relative hierarchy position minus one.

20. The method set forth in claim 19 wherein said group having bits of said multiplier which are the least significant is of lowest hierarchy, and said group having bits of said multiplier which are the most significant is of highest hierarchy.

21. A method of multiplying comprising the steps of:
   a) forming a first plurality of data groups from data formed by taking multiplier data and placing a first replica of a sign bit of said multiplier data in a next most significant bit position of said sign bit;
   b) selecting a coefficient for each of said data groups, and for at least one of said data groups said selection step determined by all bits of one of said data groups and all bits of a second plurality of data groups;
   c) applying said coefficients to each of a first plurality of copies of multiplicand input data to provide a first plurality of weighted multiplicands;
   d) summing said first plurality of multiplicands to form a quotient.

22. A method of multiplying comprising the steps of:
   a) forming a first plurality of data groups from data formed by taking multiplier data and placing two replicas of a sign bit of said multiplier data in a next two most significant bit positions of said sign bit;
   b) selecting a coefficient for each of said data groups, and for at least one of said data groups said selection step determined by all bits of one of said data groups and all bits of a second plurality of data groups;
   c) applying said coefficients to each of a first plurality of copies of multiplicand input data to provide a first plurality of weighted multiplicands;
   d) summing said first plurality of multiplicands to form a quotient.

23. A signed multiplier data encoder for receiving said multiplier data, which includes a bit signifying the sign of said multiplier, and providing a plurality of coefficients which can then be applied to individual copies of multiplicand data which can then be summed to form quotient data, comprising:
   a) a plurality of summing circuits each having inputs coupled to predetermined bit positions of said multiplier data and a carry input and each having an output indicative of one of said coefficients;
   b) a like plurality of decoding circuits each having as inputs signals present in one of said summing circuits and providing, in response to said inputs, an output coupled to said carry input of another of said summing circuits.

24. The signed multiplier data encoder set forth in claim 23 wherein said output coupled to said carry input of another of said summing circuits is in a first logic state when a sum of said carry input and said predetermined bit positions of said multiplier data are equal to, or greater than, $2^N-1$, where N is the number of said predetermined bit positions of said multiplier data, and is in a second logic state otherwise.

25. The signed multiplier data encoder set forth in claim 23 wherein each of said groups comprise segments of said bits of said signed multiplier data.

26. The signed multiplier data encoder set forth in claim 25 wherein the number of bits in each of said groups is two.

27. The signed multiplier data encoder set forth in claim 23 further including a first plurality of selector blocks each receiving one of said first output signals and a copy of said multiplicand and providing a multiplicand multiplied by one of said coefficients in response to said first output signal input to said selector block.

28. The signed multiplier data encoder set forth in claim 27 wherein said each of said first output signals has a scale factor selected from a third plurality of digital signals which together have one of four states.

29. The signed multiplier data encoder set forth in claim 28 wherein said scale factor is one of a group of 0, 1X, 2X, and −1x.

30. A multiplier for multiplying multiplicand data by signed multiplier data which includes a bit signifying the sign of said multiplier to provide quotient data, said multiplier comprising:
   a) an encoder for grouping said multiplier data and for assigning coefficients to each of said groups, wherein said groups, depending on the bit pattern of each of said groups, may or may not influence another group's assigned coefficient;
   b) a plurality of data selectors coupled to said multiplicand data and to one of said assigned coefficients and providing the product of one of said coefficients times a copy of said multiplicand data; and
   c) a summer coupled to said plurality of registers and providing said quotient data.

31. The multiplier set forth in claim 30 wherein the number of said groups is greater than X, where X is an integer formed by rounding a number Y to the next highest integer, if necessary, and Y=J/K, where J is the number of bits in said multiplier data and K is the number of multiplier data bits in each of said groups.

32. A multiplier for multiplying multiplicand data by multiplier data which includes a bit signifying the sign of said multiplier to provide quotient data, said multiplier comprising:
   a) means for grouping said multiplier data and for assigning coefficients to each of said groups, wherein said groups, depending on the bit pattern of each of said groups, may or may not influence another group's assigned coefficient;
   b) a plurality of registers each holding the product of one of said coefficients times a copy of said multiplicand data; and
   c) a summer coupled to said plurality of registers and providing said quotient data.

\* \* \* \* \*